(12) United States Patent
Li et al.

(10) Patent No.: US 11,283,609 B2
(45) Date of Patent: Mar. 22, 2022

(54) METHOD AND APPARATUS FOR SUPPORTING SECURE DATA ROUTING

(71) Applicants: Xu Li, Nepean (CA); Hang Zhang, Nepean (CA)

(72) Inventors: Xu Li, Nepean (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/000,097

(22) Filed: Aug. 21, 2020

(65) Prior Publication Data

US 2022/0060328 A1 Feb. 24, 2022

(51) Int. Cl.
| | |
|---|---|
| *H04L 29/06* | (2006.01) |
| *H04L 9/32* | (2006.01) |
| *G06N 3/08* | (2006.01) |
| *H04L 9/08* | (2006.01) |

(52) U.S. Cl.
CPC .............. *H04L 9/321* (2013.01); *G06N 3/08* (2013.01); *H04L 9/0891* (2013.01); *H04L 63/0421* (2013.01); *H04L 63/0428* (2013.01)

(58) Field of Classification Search
CPC ... H04L 9/321; H04L 9/0891; H04L 63/0421; H04L 63/0428; G06N 3/08
See application file for complete search history.

(56) References Cited

U.S. PATENT DOCUMENTS

| | | | |
|---|---|---|---|
| 7,079,655 B1 * | 7/2006 | Tochikubo | H04L 9/08 380/281 |
| 11,151,284 B2 * | 10/2021 | Haletky | G06N 20/00 |

(Continued)

FOREIGN PATENT DOCUMENTS

| | | |
|---|---|---|
| CN | 110490738 A | 11/2019 |
| CN | 110704850 A | 1/2020 |

(Continued)

*Primary Examiner* — Chau Le

(57) ABSTRACT

There is provided a method and system for supporting secure data routing for artificial intelligence services in a communication network. According to embodiments there is provided a system including a platform controller for managing artificial intelligence (AI) services and a coordinator for managing data transmission of the AI services. The platform controller is configured to obtain, from an AI controller, a first security credential used for re-encryption of uplink data for an AI service, wherein the uplink data includes encrypted data from a device and obtain, from the device, a second security credential for re-encryption of downlink data for the AI service, wherein the second downlink data includes encrypted data from an AI server. The platform controller is further configured to provide, to the coordinator, both the first security credential and the second security credential. The coordinator is configured to receive, from the platform controller, both the first security credential and the second security credential and perform re-encryption of the uplink data for the AI service and send re-encrypted uplink data to the AI server. The coordinator is further configured to perform re-encryption of the downlink data for the AI service and send re-encrypted downlink data to the device.

20 Claims, 10 Drawing Sheets

(56) References Cited

U.S. PATENT DOCUMENTS

| | | | |
|---|---|---|---|
| 2007/0237332 A1* | 10/2007 | Lyle | H04L 63/0464 380/263 |
| 2009/0228708 A1* | 9/2009 | Trostle | H04L 63/0421 713/171 |
| 2014/0052642 A1* | 2/2014 | Spies | G07F 7/1091 705/71 |
| 2019/0028608 A1* | 1/2019 | Kang | H04N 19/126 |
| 2019/0188386 A1 | 6/2019 | Pogorelik et al. | |
| 2020/0007931 A1 | 1/2020 | Ho et al. | |
| 2020/0073882 A1 | 3/2020 | Guggilla et al. | |
| 2020/0250312 A1 | 8/2020 | Kumar Addepalli et al. | |
| 2021/0329466 A1* | 10/2021 | Khasnabish | H04W 16/10 |

FOREIGN PATENT DOCUMENTS

| | | |
|---|---|---|
| CN | 111460443 A | 7/2020 |
| CN | 111538598 A | 8/2020 |

\* cited by examiner

METHOD AND APPARATUS FOR SUPPORTING SECURE DATA ROUTING

FIELD OF THE INVENTION

The present invention pertains to data privacy protection and in particular to a method and apparatus for supporting secure data routing for artificial intelligence services in a communication network.

BACKGROUND

Machine learning is an artificial intelligence (AI) technology that uses artificial neural network (ANN). Machine learning is popularly used for modeling, classifying, and recognizing complex data. In parallel to the flourishing of AI technology, machine learning is also increasingly associated with more devices including personal devices such as smart phones and tablets.

Deep learning, as a branch of machine learning, extracts features from training data and identifies which of features are relevant to the target problem. Deep learning is especially suitable for correlated data and becomes useful in a variety of applications. Currently, deep learning is increasingly performed, and thus a large amount of data is collected for training because data collection is related to the accuracy of the AI model associated with the deep learning. As the data collected for deep learning often includes sensitive and private data, privacy issues arise and privacy-preserving techniques are desired.

In deep learning, protection of data privacy (e.g. differential privacy) may be achieved using various techniques. For example, noise may be added into AI training data without jeopardizing its statistical properties, so that the trained AI model can capture features in the original data set. In another example, cryptographic techniques may be applied to AI training data such that learning is based on encrypted data without decryption.

However, when a network entity forwards data to another network entity (e.g. client and AI server) to enable data routing between the two network entities, this network entity may be able to read the data and this will cause data privacy leakage. As the data transmitted between two network entities often includes sensitive and private data, privacy issues arise and privacy-preserving techniques are desired.

As another example, protection of data privacy may be achieved using federated learning (FL) and split learning (SL). FL and SL train a deep learning model (e.g. deep neural network (DNN)) without requiring raw training data to leave the client devices, which own or hold the data. Put another way, both FL and SL do not require raw training data to be uploaded to the training server. As clients do not send raw training data but send model parameters to the training server, both FL and SL are considered to provide a level of differential privacy. As is known, differential privacy is a system for publicly sharing information about a dataset by describing the patterns of groups within the dataset while withholding information about individuals in the dataset.

In SL, the DNN is split into two disjoint components by a pre-defined cut layer, as is illustrated in FIG. 1. Referring to FIG. 1, layers 101 and 105 are respectively an input layer and output layer, and layers 102 to 104 are hidden layers. The lower layer component includes the input layer 101 and is run on the client side. The upper layer component runs on the server side. A cut can be at any layer below the output layer 105 (e.g. any of the layers 101 to 104 in FIG. 1). The cut or the cut layer can also be freely defined as long as it can properly produce two partitions. For example, the cut layer can be defined as the middle cut 120, as is illustrated in FIG. 1.

SL essentially trains the global model directly using all the local data sets and thus can in principle have little or no loss of model accuracy. However, on the other hand, SL has scalability issues due to the sequential learning nature.

In FL, each of individual clients trains a local model only using their own data sets and updates the model parameters (e.g. gradients) to a training server where a global model (e.g. global model parameters) is maintained. The training server aggregates updates received from the clients thereby adjusting the existing global model. Then, the updated global model parameters are returned to the clients. Upon receipt of the global model parameters, the clients continue to train the local model based on the received parameters. The procedure repeats until the global model converges or a predetermined termination condition is met (e.g. maximal number of repetition or accuracy threshold is reached). FL can be viewed as a generalized implementation of stochastic gradient decent (SGD) with flexible batch size and participating clients.

FL combines simultaneously trained local models to generate a global model. However, as the local models are based on pure local data that is, in general, non IID (independent and identically distributed), FL lacks model accuracy while providing good scalability.

It has been known that an insider adversary with complete knowledge of the learning model can construct information that is similar to the training data by taking advantage of the gradual course of model convergence. In FL, this causes information leakage to malicious clients without violating differential privacy. SL does not have the problem suffered by FL. However, as no client has complete knowledge of the deep learning model, information leakage to the training server is as inevitable in SL as in FL.

In view of the foregoing, there is therefore a need for a method and apparatus for supporting secure data routing in a communication network, that is not subject to one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

An object of embodiments of the present invention is to provide a system, method and apparatus for secure data routing for artificial intelligence (AI) services is to provide a level of security and anonymity in a communication between a device and an AI server of AI services.

In accordance with embodiments of the present invention, there is provided a system including a platform controller for managing artificial intelligence (AI) services and a coordinator for managing data transmission of the AI services. The platform controller is configured to obtain, from an AI controller, a first security credential used for re-encryption of uplink data for an AI service, wherein the uplink data includes encrypted data from a device and obtain, from the device, a second security credential for re-encryption of downlink data for the AI service, wherein the second downlink data includes encrypted data from an AI server. The platform controller is further configured to provide, to the coordinator, both the first security credential and the second security credential. The coordinator is configured to receive, from the platform controller, both the first security credential and the second security credential and perform re-encryption of the uplink data for the AI service and send re-encrypted uplink data to the AI server. The coordinator is further configured to perform re-encryption of the downlink data for the AI service and send re-encrypted downlink data to the device. According to embodiments, a possible technical effect of the system is to enable a secure and anonymous communication between the device and the AI server.

In some embodiments, the uplink data includes one or more of data used to update a set of parameters of an AI model for the AI service and values each of which corresponds to one or more of a set of parameters of an AI model for the AI service. A possible technical effect of this feature is to allow data related to model training to be routed as uplink data through the system.

In some embodiments, the AI server is further configured to receive and decrypt the re-encrypted uplink data and update the AI model for the AI service according to the decrypted data. A possible technical effect of this feature is to allow the AI server to use uplink data for model training.

In some embodiments, the downlink data include one or more of at least partial of the set of parameters with updated values and data related to back propagation. A possible technical effect of this feature is to allow the AI server to provide updated model parameters to the device or allow back propagation to be continued on the device for model parameter updating.

In some embodiments, the platform controller is further configured to indicate to the device, the coordinator and the AI server to activate at least one of re-encryption of uplink data and re-encryption of downlink data based on security credentials; wherein the coordinator is configured to perform re-encryption of data communicated between the device and the AI server as the platform controller indicates. A possible technical effect of this feature is to allow dynamic activation of secure data routing, for example when the system has sufficient capacity/resource to perform the related operations (efficiently).

In some embodiments, the AI server is further configured to receive the re-encrypted uplink data from the coordinator and perform decryption on the received re-encrypted uplink data if the platform controller indicates to activate at least re-encryption of uplink data based on security credentials.

In some embodiments, the device is further configured to encrypt data based on a device security credential if the platform controller indicates to activate at least re-encryption of uplink data based on security credentials and send the encrypted data to the coordinator.

In some embodiments, the device is further configured to receive the re-encrypted downlink data from the coordinator and perform decryption on the received re-encrypted downlink data if the platform controller indicates to activate at least re-encryption of downlink data based on security credentials.

According to embodiments, the AI server is further configured to encrypt data based on a server security credential if the platform controller indicates to activate at least re-encryption of downlink data based on security credentials and send the encrypted data to the coordinator.

According to some embodiments, the platform controller is further configured to indicate to the device, the coordinator and the AI server to de-activate at least one of activated re-encryption of uplink data and activated re-encryption of downlink data; wherein the coordinator is configured to stop performing re-encryption of data communicated between the device and the AI server as the platform controller indicates. A possible technical effect of this feature is to allow for dynamically deactivating secure data routing, e.g. when the system is (over)loaded or has no sufficient capacity/resource to perform the related operations (efficiently).

According to some embodiments, the platform controller is further configured to receive, from the AI controller, an AI service registration request for registering the AI service, wherein the AI service registration request includes the first security credential. A technical effect of this feature is to allow the security credentials to be preconfigured, before data communication occurs, in order to reduce runtime delay/overhead.

According to some embodiments, the platform controller is further configured to receive, from the AI controller, a request for training associated with the AI model for the AI service, wherein the request includes the first security credential. Alternatively, the platform controller is further configured to receive, from the device, a request for access to the AI service, wherein the request includes the second security credential. A possible technical effect of this feature is to allow dynamic updating/providing of security credentials.

In accordance with embodiments of the present invention, there is provided a method for managing artificial intelligence (AI) services. The method includes obtaining, by a platform controller from an AI controller, a first security credential used for re-encryption of uplink data for an AI service, wherein the uplink data includes encrypted data from a device. The method further includes obtaining, by the platform controller from the device, a second security credential for re-encryption of downlink data for the AI service, wherein the second downlink data includes encrypted data from an AI server. The method further includes providing, by the platform controller to a coordinator, both the first security credential and the second security credential and receiving, by the coordinator from the platform controller, both the first security credential and the second security credential. The method further includes performing, by the coordinator, re-encryption of the uplink data for the AI service and send re-encrypted uplink data to the AI server and performing, by the coordinator, re-encryption of the downlink data for the AI service and send re-encrypted downlink data to the device.

According to embodiments, the device can be configured as a terminal device, which can include by not limited to an internet of things (IoT) device, a wearable device, a vehicular device, a vehicle mounted device, a vehicle on board device and other terminal device as would be readily understood.

According to embodiments, the AI service can be used in a variety of different applications, including but not limited to satellite communications, internet of vehicle (IoV) applications and other applications as would be readily understood.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Definitions

It should be noted that the terms 'device' and 'client' are interchangeably used in the instant application. It should be further noted that the terms 'AI server' and 'server' are interchangeable used in the instant application. It should be further noted that the terms 'AI training and 'training' are interchangeable used in the instant application. It should be further noted that the terms 'AI inference' and 'inference' are interchangeable used in the instant application.

It should be noted that the terms 'bottom level', 'bottom learning' and 'bottom learning level' are interchangeably used in the instant application. Similarly, it should be further noted that 'top level', 'top learning' and 'top learning level' are interchangeable used in the instant application.

The present disclosure addresses a data privacy issue that arises when the intermediary network entity supporting data routing (or data forwarding) between the sender and the receiver. When an intermediary network entity forwards or routes data between a sender and receiver (e.g. client and AI server), the intermediary network entity may be able to read the data routed between the sender and receiver. This can cause data privacy leakage. It should be noted that while embodiments of the present disclosure are described in the context of deep learning and AI inference, methods and apparatuses disclosed herein can be also used in other scenarios.

Figure 1:
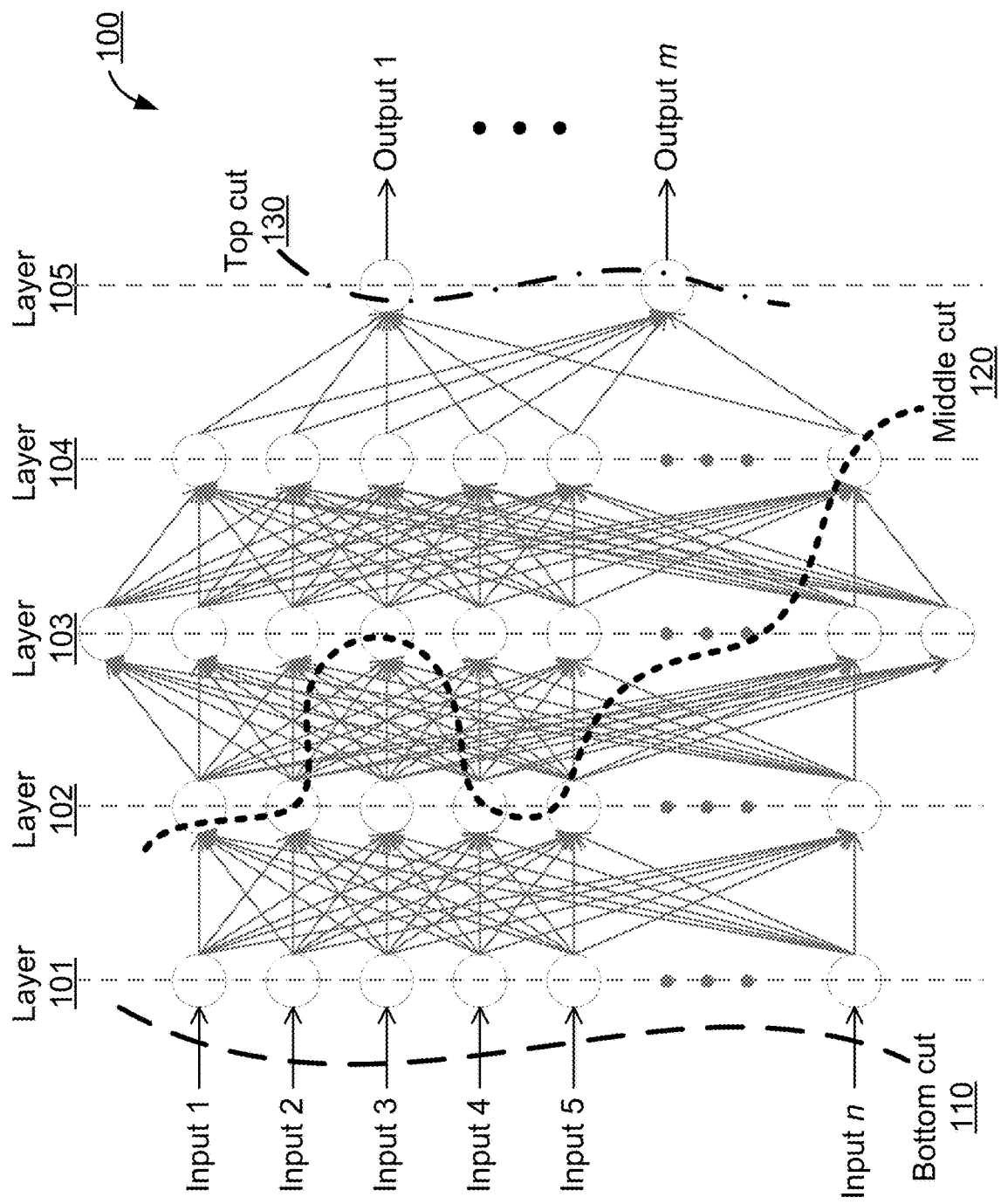
FIG. 1 illustrates a deep neural network (DNN) with different types of cut layers partitioning the network.

FIG. 1 illustrates a deep neural network (DNN) with different types of cut layers partitioning the network. Referring to FIG. 1, the DNN 100 includes a number of nodes (neurons). Each node is on one of the layers 101, 102, 103, 104 and 105, and is communicatively connected to one or more other nodes in adjacent layers. The layer 101 represents an input layer, the layer 105 represents an output layer, and the layers 102, 103 and 104 may represent hidden layers. Each of the bottom cut 110, middle but 120 and top cut 130 is also illustrated in the figure.

Split learning (SL) can be generalized by extending the definition of the cut layer such that FL and CL are regarded as two special cases of the SL. In FL, each device (or client) has knowledge of the AI model and trains the model using its local data set. FL can be considered as SL applying a top cut (e.g. top cut 130), where the cut layer is selected at or above the output layer (e.g. output layer 105). On the other hand, CL requires devices to send raw training data to the AI server and learning occurs purely on the server side. CL can thus be viewed as SL applying a bottom cut (e.g. bottom cut 110), where the cut layer is at or below the input layer (e.g. input layer 101). Traditional SL corresponds to cases where the DNN is partitioned by a middle cut (e.g. middle cut 120).

Figure 2:
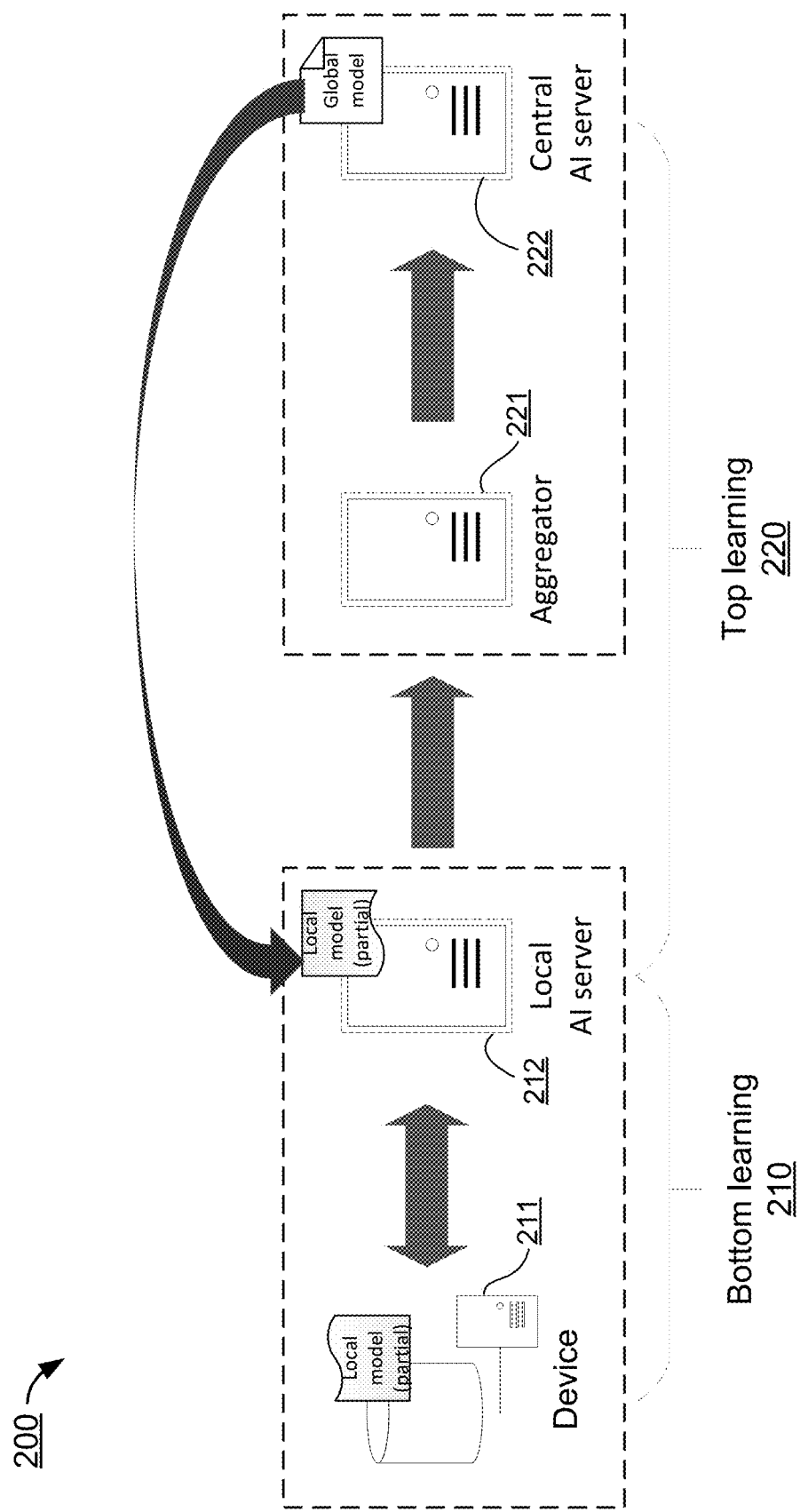
FIG. 2 illustrates a generic multi-level learning framework with a bottom learning level and a top learning level, in accordance with embodiments of the present disclosure.

The generalized SL and the FL can be combined to obtain a generic multi-level learning framework, as illustrated in FIG. 2. FIG. 2 illustrates a generic multi-level learning framework with a bottom learning level and a top learning level, in accordance with embodiments of the present disclosure.

Referring to FIG. 2, the multi-level learning framework 200 including a bottom learning level (i.e. bottom learning) 210 and a top learning level (i.e. top learning) 220. At the bottom learning level 210, there are devices 211 and local AI servers 212. At the top learning level 220, there are aggregators 221 and the central AI server 222 and further include the local AI servers 212 as illustrated in FIG. 2. Generalized SL is applied at the bottom learning level 210 and FL is applied at the top learning level 220. Bottom learning level 210 runs between devices 211 and local AI servers 212 in order to train local AI models at the local AI servers 212. On the other hand, top learning level 220 runs between the local AI servers 212 and the central AI server 222, optionally with assistance from one or multiple aggregators 221.

Further referring to FIG. 2, the aggregator 221 is a special type of the local AI server 212. It receives model parameters of the trained local AI models, for example from local AI servers 212 which interact with devices 211 for bottom learning level. Upon the receipt of the model parameters, the aggregator(s) 221 aggregate (e.g. average) the received model parameters and sends them to the central AI server 222 in an aggregate form. The central AI server 222 generates or updates model parameters of a global AI model using the received model parameters (which may be in aggregate form) of local AI models. The central AI server 222 also provides the latest model parameters of the global AI model to the local AI servers 212 thereby synchronizing the local AI models and the global AI model. The local AI servers 212, the aggregators 221 and the central AI server 222 are all logical components. As such, in some embodiments, at least some of these components may be integrated or combined into a single entity where functions of each component are implemented.

The multi-level learning framework 200 may provide advantages of both FL and SL without their drawbacks, especially when a middle cut (e.g. middle cut 120 in FIG. 1) is selected for the cut layer. According to embodiments, the selected cut layer designates a bottom learning level within the multi-level learning framework. As the bottom learning level 210 runs based on combined data sets of multiple clients 211, the local AI models trained by the local AI servers 212 are more accurate than AI models trained by the single device 211 using only its own data set in FL. It may be noted that the combined data set of multiple devices is less non-IID (independent and identically distributed) therefore more independent and identically distributed than data set of a single device. Generally speaking, improved local model accuracy results in accelerated convergence (to a satisfactory content) of the global AI model. Thus, the multi-level learning framework is expected to perform such that the performance curve, in terms of convergence and model accuracy, of the multi-level framework is between performance curves of FL and SL. Further, since devices (clients) do not have complete knowledge of the AI model (e.g. DNN structure, model parameters), information in the training data will not be leaked to adversarial entities (e.g. untrusted client devices).

Devices associated with the same local AI server for bottom learning level may be assigned to a single cut layer. In other words, same cut layer may be selected for devices associated with the same local AI server for bottom learning level. In this way, the devices and the local AI server can operate in alignment with each other's behaviour during the AI model training (e.g. learning). Under this constraint, a mix cut may be applied for bottom learning level in consideration of device status (e.g. power/energy level), AI server condition (e.g. loading), network conditions (e.g. loading, congestion, etc.) and locations of devices and servers. A mix cut optimally applied for bottom learning level may improve performances of one or more of the device, server and network.

Figure 3:
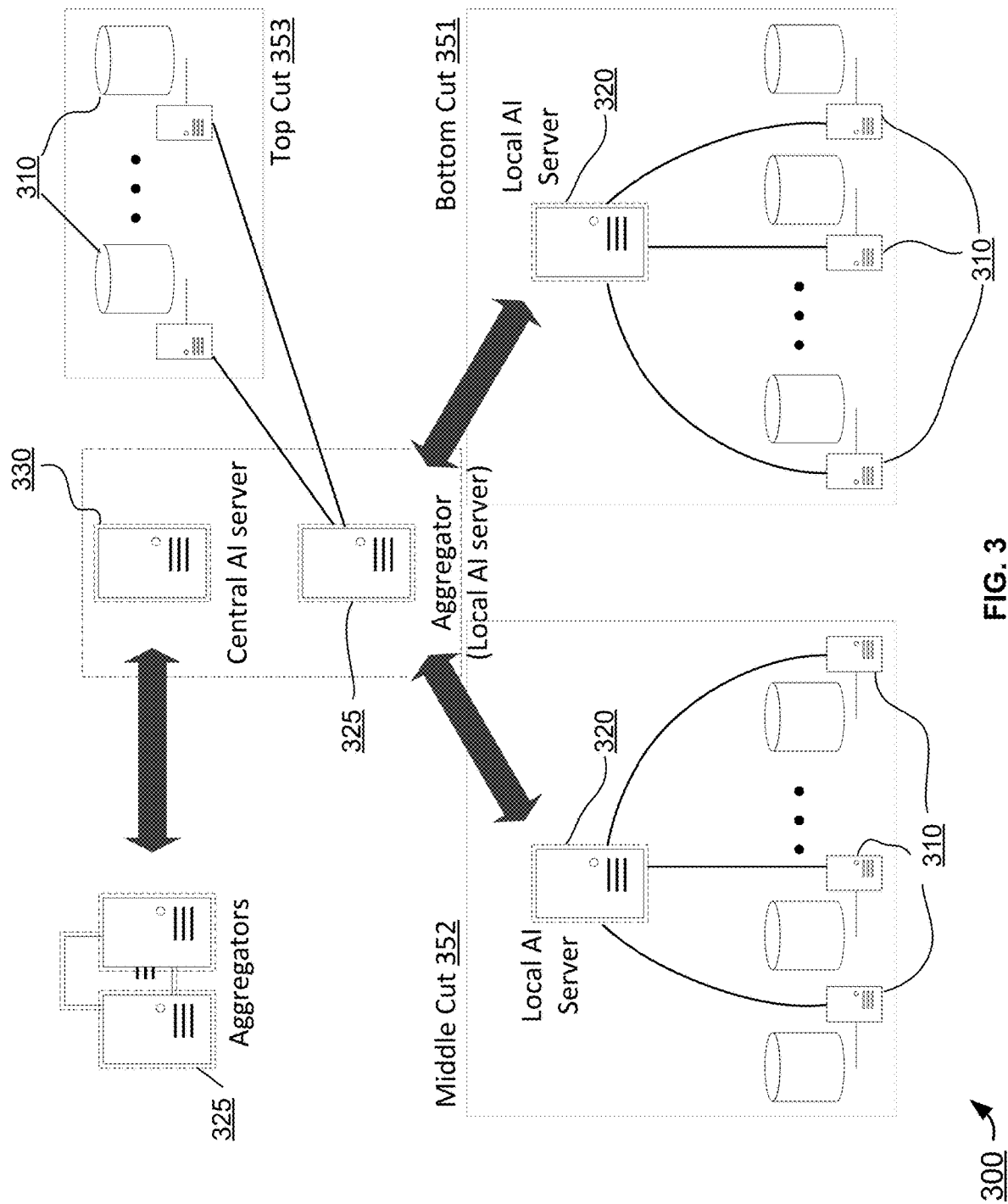
FIG. 3 illustrates a client-server association in a DNN with a mix cut applied, in accordance with embodiments of the present disclosure.

According to embodiments, when a mix cut is applied, a different cut layer can be selected for each group of devices (e.g. for each individual client in the group) and each device group is associated with a different local AI server, as illustrated in FIG. 3. FIG. 3 illustrates a client-server association in the DNN 300 with a mix cut applied, in accordance with embodiments of the present disclosure. Referring to FIG. 3, each link connecting the device 310 and the local AI server 320 or the aggregator 325 represents their association. Clients 310 linked to the same local AI server (e.g. one of the local AI servers 320) form a device group associated with that local AI server. In FIG. 3, there are three groups of clients 310 associated with three different local AI servers 320. Each group is associated with the bottom cut 351, the middle cut 352 and the top cut 353, respectively. In some embodiments, the central AI server 330 and the aggregator 325 may be the same entity, as is indicated by the dashed box surrounding them in the figure. In some embodiments, the central AI server 330 and the aggregator 325 may be two different entities.

Further will be illustrated about an AI service supporting platform that supports the multi-level learning framework in (communication) network environment. The platform supports the multi-level learning framework by selecting an appropriate cut layer for each device at the bottom learning level (i.e. bottom learning), and by routing traffic between devices and servers. Such platform can be operated by a third party. The third party is referred to as platform operator, as it can be distinguished from an AI service consumer (e.g. entity that owns or controls the devices) or an AI service provider (e.g. entity that owns or controls the AI servers). The platform includes one or more control plane components (e.g. platform controllers) and a plurality of data plane components (e.g. coordinators). All of these components may be logical components.

Figure 4:
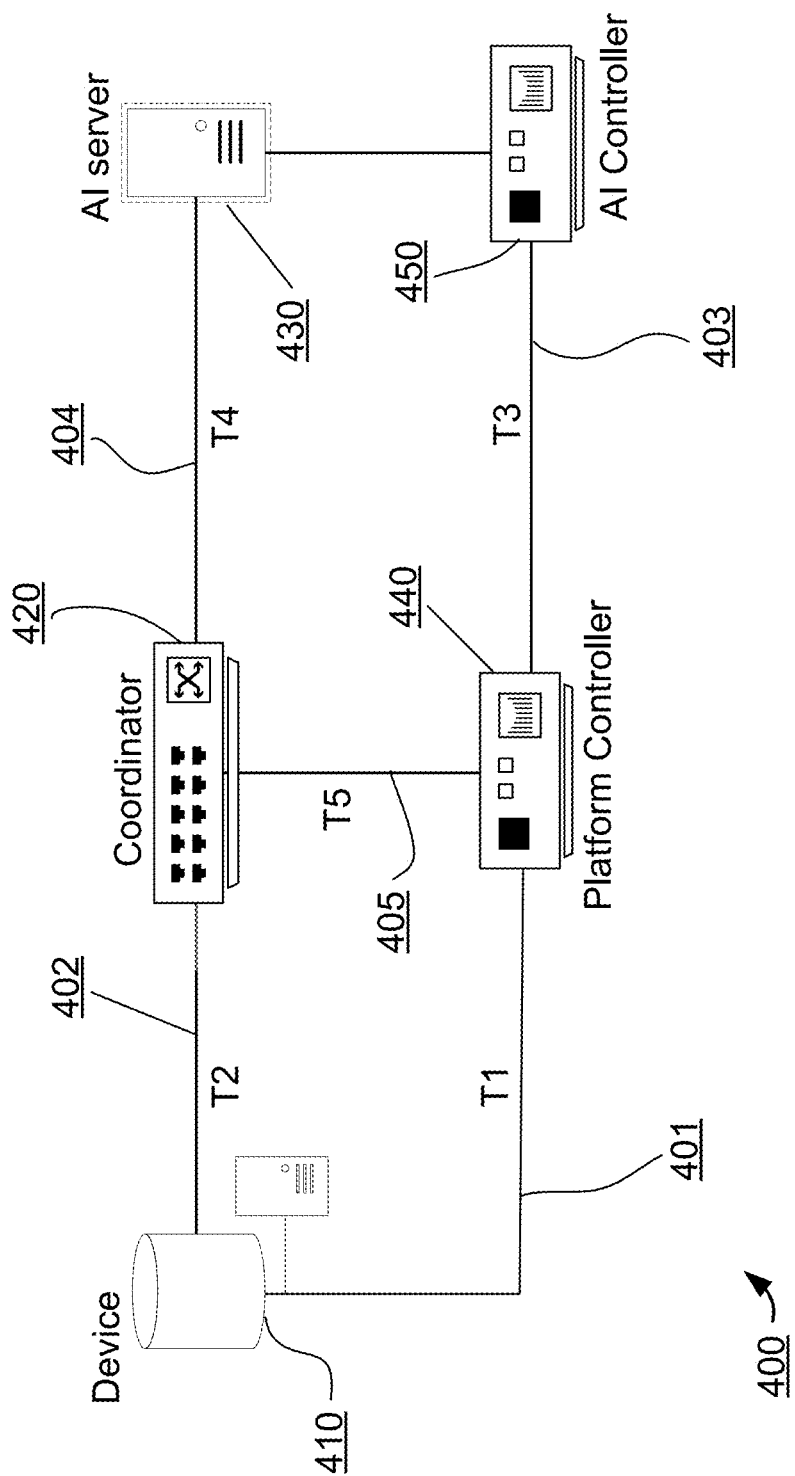
FIG. 4 illustrates an architecture of the AI service platform that supports multi-level learning framework, in accordance with embodiments of the present disclosure.

FIG. 4 illustrates an architecture of the AI service platform 400 that supports multi-level learning framework, in accordance with embodiments of the present disclosure. The platform 400 includes a plurality of components including the device(s) 410, the coordinator(s) 420, the AI server 430, the platform controller 440 and the AI controller 450.

The components are communicatively connected to each other via various interfaces. Specifically, referring to FIG. 4, the device 410 is communicatively connected to the coordinator 420 over the interface T2 402 and to the platform controller 440 over the interface T1 401. The coordinator 420 is communicatively connected to the device(s) 410 over the interface T2 402, to the AI server 430 over the interface T4 404 and to the platform controller 440 over the interface T5 405. The AI server 430 is communicatively connected to the coordinator 420 over the interface T4 404 and is communicatively connected to the AI controller 450. The platform controller 440 is communicatively connected to the device(s) 410 over the interface T1 401, to the AI controller 450 over the interface T3 403 and to the coordinator 420 over the interface T5 405. The AI controller 450 is communicatively connected to the platform controller 440 over the interface T3 403 and is communicatively connected to the AI server 430. It may be noted that the interfaces T1 401, T3 403 and T5 405 are control plane interfaces (or connections) and the interfaces T2 402 and T4 404 are data plane interfaces (or connections).

According to embodiments, the platform controller manages (e.g. register, modify, de-register) AI services upon request from AI service providers (e.g. AI controller 450 in FIG. 4). For a registered AI service, the platform controller creates or maintains a service instance comprising all or a selected subset of the coordinators. The platform controller associates each of the coordinators (included in the service instance) with the local AI server providing the AI service. In various embodiments, one coordinator may be associated with one local AI server.

The platform controller selects or authorizes devices based on the devices' consent or subscription to the AI service. The platform controller also associates the devices with one or more coordinators included in the service instance. For example, this association can occur when a device is registered at the platform or when the AI service provider requests for training (e.g. training an AI model).

Each of the coordinators is associated with either a group of at least k devices for the AI service or no devices at all. Here, k is a system parameter related to k-anonymity provisioning.

The client-server association (e.g. client-server association described in FIG. 2) is realized via the coordinators. For example, a group of devices, each of which are communicatively connected to the coordinator, are associated with the server, which is also communicatively connected to the coordinator (e.g. coordinator 420 in FIG. 4). In this way, the devices and the server can be associated without knowing each other, as the client-server association is enabled via the intermediary entity, for example the coordinator 420 in FIG. 4.

According to embodiments, in support of AI model training, the platform controller selects a single cut layer (i.e. same cut layer) for devices associated with the same coordinator. Based on the cut layer selected, bottom learning level or top learning level is performed by the AI server and the devices. The AI server and the devices are associated, without knowing each other, via the intermediary coordinator to which the AI server and the devices are communicatively connected, respectively. Specifically, when a top cut (e.g. top cut 130 in FIG. 1) is selected, the learning associated with the AI server and the devices is top learning level, namely in this case the bottom learning level essentially reduces into the devices). Otherwise, the learning associated with the AI server is bottom learning level. In some embodiments, the cut layers selected for devices associated with different coordinators may be different from each other. With different cut layers, learning corresponds to the mix cut scenario described elsewhere in this disclosure.

The coordinators operate like proxy and route data between devices and AI servers that are associated with (or communicatively connected to) them, during AI model training and AI inference for the AI service. Each coordinator can provide k-anonymity provisioning in the process (e.g. ensure at least k devices, among the devices associated with the coordinator, are involved in the process). When there are an insufficient number of devices involved in the process (e.g. client's dropout from model training or client's refusal to model training), the coordinator can request the platform controller for additional devices to assigned to that particular coordinator.

In the process of of AI model training (e.g. training cycle), a device sends data to the coordinator that the device is associated with. If a bottom cut is selected for the cut layer, the data sent by the device may be raw training data. If a middle cut is selected for the cut layer, the data may be model parameters related to the selected cut layer. If a top cut is selected, the data may be the entire set of model parameters.

After receiving the data, the coordinator forwards the data to the AI server corresponding to it. The AI server performs AI model training using the data received from the coordinator and may send, to the coordinator, return-data which is related to the model training. The return data may include data for backpropagation (e.g. gradients related to the selected cut layer) when a middle cut is selected, or updated model parameters when a top cut is selected.

Upon receiving return-data, the coordinator forwards the return-data to the device. The device uses the return-data to continue the training. For example, the device may perform the backpropagation using the gradients included in the return data, in order to adjust the model parameters in the local component of the model (i.e. the partition(s) at or below the cut layer), or may update the model parameters in the local component with those in the return-data.

If a top cut is selected (e.g. the cut layer is selected at or above the output layer), the device would have the AI model locally after it trains the model using its local data. The device therefore can perform AI inference locally using the AI model saved on the device.

If a bottom or middle cut is selected (e.g. the cut layer is selected below the output layer), the device does not have AI model or (full) information about the AI model. As such, the device would need to communicate with the AI server for AI inference. The communication between the device and the AI server may occur via the coordinator that the device is associated with. If a bottom cut is selected (e.g. the cut layer is selected at or below the input layer), the device sends raw input data (i.e. data in the original form) to the associated coordinator. If a middle cut is selected (e.g. the cut layer is selected between the output and the input layer), the device feeds the input data to the local component of the AI model to obtain local output (e.g. intermediate results of the AI inference). The device then sends the local output to the associated coordinator.

The coordinator subsequently forwards the received data to the corresponding AI server. As described above, the data received from the device may be raw input data, local output, or a combination thereof. The AI server then processes the data (e.g. AI inference) based on the AI model, and transmits the final output to the device via the coordinator along the backward path (e.g. the same communication path between the device and the server, but in the opposite direction).

According to embodiments, the coordinator can take an intermediary role in the AI model training and AI inference as illustrated above. Such an intermediary coordinator enables privacy protection by hiding the two end parties (i.e. devices and servers) from each other. In other words, due to the intermediary coordinators, the devices and the AI servers do not know each other, thereby protecting both user privacy and server privacy (e.g. server location) and avoiding adversarial attacks (e.g. denial of service (DoS) attacks).

For data privacy, the coordinator should be unable to read the data when the device sends raw data to the AI server for AI model training or AI inference, (e.g. in case of a bottom cut) and when the AI server sends data (e.g. AI inference result) to the device (e.g. in case of middle or bottom cut). In this way, the data communicated between the device and the AI server can be further protected.

Figure 5:
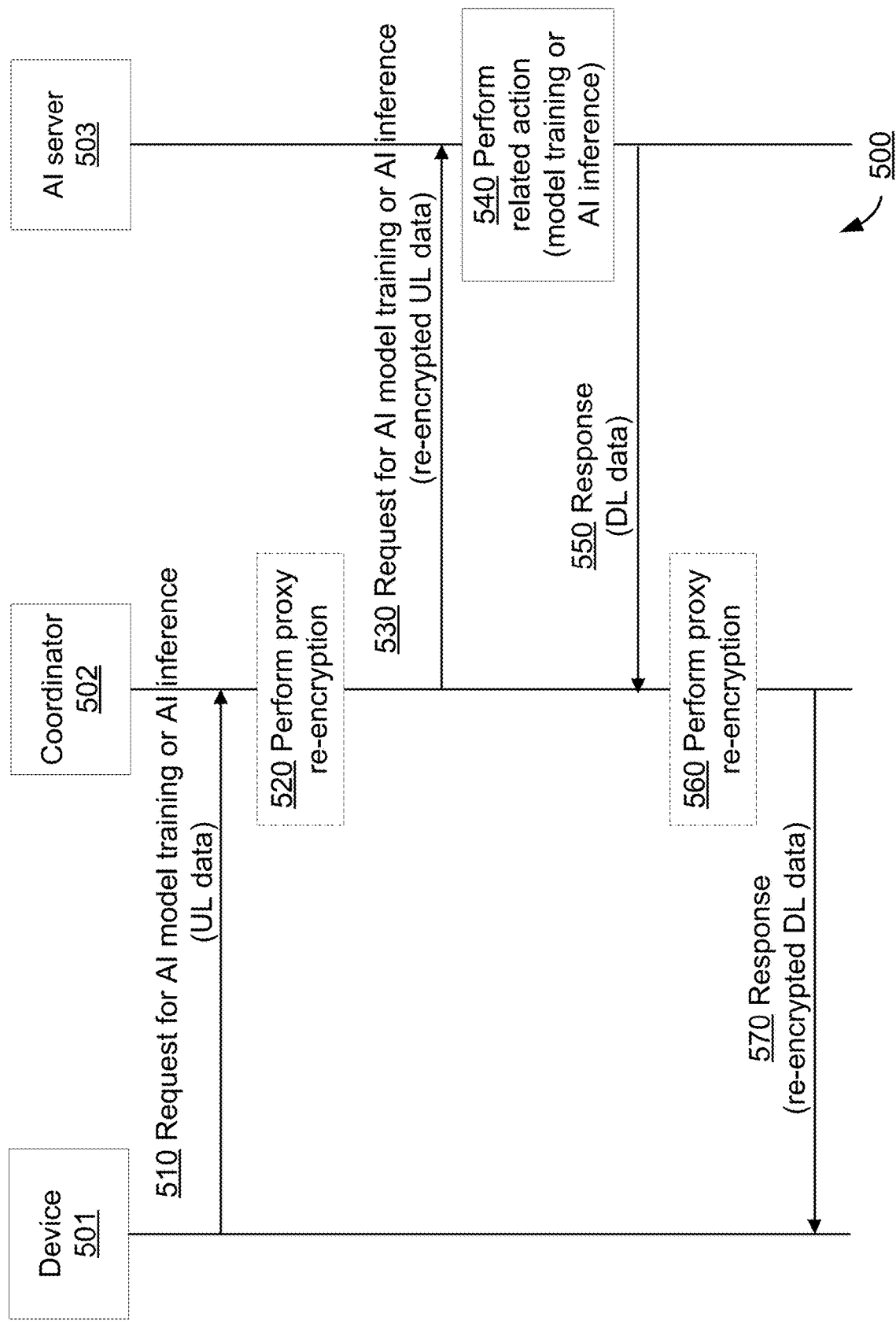
FIG. 5 illustrates, in a flow diagram, a procedure for secure data routing for AI model training or AI inference using data proxy re-encryption at the coordinator, in accordance with embodiments of the present disclosure.

The AI service supporting platform can be enhanced in terms of data privacy protection using the intermediary coordinator, during AI model training or AI inference. For that, data may be transmitted between a device and an AI server via an intermediary coordinator that the device and the AI server are associated with. As stated above, the device and the AI server do not know each other, due to the intermediary coordinator. Given that the device and the AI server do not know each other, enhanced data (privacy) protection can be achieved using proxy re-encryption techniques, as illustrated in FIG. 5. An example of proxy re-encryption that can be used is provided in Qin, Zhiguang & Xiong, Hu & Wu, Shikun & Batamuliza, Jennifer. (2015). A Survey of Proxy Re-Encryption for Secure Data Sharing in Cloud Computing. IEEE Transactions on Services Computing. 1939-1374. 10.1109/TSC.2016.2551238. It will be readily understood that other methods of proxy encryption would be readily understood by a worker skilled in the art.

FIG. 5 illustrates, in a flow diagram, a procedure 500 for secure data routing for AI model training or AI inference using data proxy re-encryption at the coordinator, in accordance with embodiments of the present disclosure.

Referring to FIG. 5, at step 510, the device 501 sends, to the coordinator 502, a request (message) for AI model training or AI inference. The request may indicate whether it is a request for AI model training or for AI inference. In various embodiments, the request includes associated uplink (UL) data (i.e. data to be delivered to the AI server 503). The UL data is encrypted by the device 501 using its own security credentials (e.g. a public key). These security credentials may be referred to as a device encryption key. The device encryption key may be pre-configured at the device 501. The UL data in its original form (i.e. before the encryption) may be referred to as original UL data. In some embodiments, the request may further include information indicative of the AI service (e.g. AI service identifier). It may be noted that the AI server and the AI server location can be used interchangeably for an AI service. It may be further noted that the AI server may be identified by the AI server location.

Upon receiving the UL data, the coordinator 502, at step 520, performs proxy re-encryption on the received UL data. The coordinator 502 may use the security credentials that is related to (or corresponds to) the AI server (e.g. a re-encryption key) to perform proxy re-encryption (i.e. to re-encrypt the received UL data). These security credentials may be referred to as a server re-encryption key. The server re-encryption key may be pre-configured at the coordinator 502, or provided to the coordinator 502 from the platform controller when the service instance is created as further discussed elsewhere herein (e.g. at step 643 of FIG. 6) or when the training cycle is being prepared as further discussed elsewhere herein (e.g. at step 843 of FIG. 8). According to embodiments, the coordinator 502 does not decrypt the UL data before re-encrypting the UL data. The result of the re-encryption may be referred to as re-encrypted UL data.

After re-encrypting the UL data, the coordinator 502, at step 530, sends, to the AI server 503, a request (i.e. a message) for AI model training or AI inference. The request may indicate whether it is a request for AI model training or for AI inference, as indicated in the request received at step 510. In various embodiments, the request to be sent to the AI server 503 includes the re-encrypted UL data acquired at step 520. The request may further include information indicative of the AI service (e.g. AI service identifier). The coordinator 502 locally stores the mapping between the request sent to the AI server 503 and the request received from the device 501 at step 510. The coordinator 502 also records that the device 501 is the sender of the request received at step 510.

The AI server 503, at step 540, decrypts the re-encrypted UL data included in the request sent by the coordinator 502. The AI server 503 may decrypt the re-encrypted UL data using its own security credentials (e.g. a private key). These security credentials may be referred to as a server description key. Upon the decryption, the AI server 503 obtains the original UL data, the AI server 503, using the original UL data, performs the related operations/actions or requested task (i.e. AI model training or AI inference), as indicated in the received request.

At step 550, the AI server 503 sends a response (i.e. message) to the coordinator 502. In various embodiments, the response message includes some DL data to be delivered to the device 501. The DL data may be encrypted by the AI server 503 using its own security credentials (e.g. a public key). This security credentials may be referred to as server encryption key. The server encryption key may be pre-configured at the AI server 503. The DL data in its original form (i.e. before the encryption) may be referred to as original DL data. In some embodiments, the response may further include information indicative of the AI service (e.g. AI service identifier).

The response (i.e. message) sent to the coordinator 502 is a response to the request sent by the coordinator 502 at step 530. The DL data included in the response message may be determined based on the UL data included in the request of step 530 and as a result of the task(s) performed by the AI server 503 at step 550.

If the request is for AI model training, the DL data may be related to one or more of the followings:
  backpropagation (e.g. including encrypted gradients associated with the cut layer)—in this case, a middle cut is selected for the learning between the device 501 and the AI server 503, and the original DL data includes the gradients associated with the (selected) cut layer;
  model parameter update—in this case, a top cut is selected for the learning between the device 501 and the AI server 503, and the original DL data includes updated parameters of the AI model;
  a simple acknowledgement for receipt of the UL data included in the request received at step 530.

If the request is for AI inference, the DL data may be associated with the result of the AI inference (e.g. including encrypted inference result). In this case, the original DL data may include the AI inference result.

At step 560, the coordinator 502 performs proxy re-encryption on the DL data sent by the AI server 503 at step 550. The coordinator 502 may use the security credentials related or corresponding to the device 501 (e.g. a re-encryption key) to perform proxy re-encryption (i.e. to re-encrypt the DL data). These security credentials may be referred to as device re-encryption key. The device re-encryption key may be pre-configured in the coordinator 502, or provided to the coordinator 502 from the platform controller when the service instance is created (e.g. at step 643 of FIG. 6) or when the training cycle is being prepared (e.g. at step 843 of FIG. 8). Alternatively, the device re-encryption key may be provided to the coordinator 502 from the platform controller during creation of the service instance (e.g. at step 643 of FIG. 6) or during preparation of the training cycle (e.g. at step 843 of FIG. 8), or provided to the coordinator 502 by the device 501 when performing device registration or service request (e.g. at step 720 or 750 of FIG. 7) or when accepting invitation to a training cycle (e.g. at step 942 of FIG. 9). According to embodiments, the coordinator 502 does not decrypt the DL data before re-encrypting the DL data. The result of the re-encryption may be referred to as re-encrypted DL data.

According to embodiments, the coordinator 502 may need to identify the device 501 before performing proxy re-encryption on the DL data sent by the AI server 503. As the response message received at step 550 is a response to the request sent at step 530, the coordinator 502 can identify the request received from the device 501 at step 510 that corresponds to the response message received at step 550, for example based on the mapping relation between the request at step 510 and the request at step 530. The mapping relation may be saved and maintained locally at the coordinator 502. The coordinator 502 can further identify the device 501 that sent the request to the coordinator 502 at step 510.

In some embodiments, the response message corresponding to the request sent at 530 may be found by comparing a reference number or an identifier included in the response message (at step 550) and a reference number or an identifier included in the request message (at step 530) and identifying that the reference number and the identifier are equal.

At step 570, the coordinator 502 sends a message to the device 501 in response to the request sent by the device 501 at step 510. The message includes the re-encrypted DL data. The message may further include information identifying the AI service (e.g. AI service identifier). After acquiring the re-encrypted DL data from the received message, the device 501 decrypts the re-encrypted DL data using its own security credentials (e.g. a private key) in order to obtain the original DL data. The security credentials used to decrypt the re-encrypted DL data may be referred to as device decryption key. The device decryption key may be pre-configured at the device 501.

According to embodiments, when proxy-re-encryption techniques are used at the coordinator as illustrated above, all of the client, coordinator and the AI server need to take proper actions or perform proper operations. The sender (e.g. the device or the AI server) encrypts the data using its encryption key and sends the encrypted data to the coordinator. Upon receiving the encrypted data, the coordinator identifies the receiver (e.g. the AI server or the device, respectively) and re-encrypts the encrypted data using the respective re-encryption key (i.e. the re-encryption key corresponding to the receiver associated with the coordinator). A server re-encryption key would be used for UL data transmission and a device re-encryption key would be used for DL data transmission. The coordinator performs the re-encryption on the encrypted data without decryption, thereby data privacy being protected. Then, the coordinator sends the re-encrypted data to the receiver, and the receiver decrypts the re-encrypted data in order to obtain the original data. The receiver may decrypt the re-encrypted data using its own decryption key. This data transmission using re-encryption technique may be referred to as secure data routing in the present disclosure and has been illustrated in FIG. 5.

According to embodiments, secure data routing can be activated or performed only when necessary, in order to reduce communication delay and computation overhead. For example, when a bottom cut is selected (e.g. the cut layer is selected at or below the input layer), secure data routing may be activated only for the UL direction (e.g. data routing from a device to an AI server for providing input for AI model training or AI inference). On the other hand, when a middle cut or a top cut is selected (e.g. the cut layer is selected above the input layer), secure data routing may be activated only for the DL direction (e.g. data routing from an AI server to a device for backpropagation or model parameters update, or return of AI inference result). In some embodiments, the participating network entities (e.g. device, coordinator, AI server) may be pre-configured to activate or perform secure data routing. In some embodiments, the participating network entities (e.g. device, coordinator, AI server) may be dynamically configured to activate or perform secure data routing. For example, the entities may be dynamically configured upon receiving (e.g. from the platform controller) information indicative of activation or performance of secure data routing.

According to some embodiments, the platform controller indicates to the device, the coordinator and the AI server to activate re-encryption of uplink data and/or re-encryption of downlink data based on security credentials. The coordinator performs re-encryption of data communicated between the device and the AI server as the platform controller indicates. For example, if the platform controller indicates the activation of re-encryption of uplink data based on security credentials, the device encrypts data based on a device (local) security credential and sends the encrypted data to the coordinator. The AI server receives the re-encrypted uplink data from the coordinator, and performs decryption on the received re-encrypted uplink data. In another example, if the platform controller indicates the activation of re-encryption of downlink data based on security credentials, the AI server encrypts data based on a server security credential and sends the encrypted data to the coordinator. The device receives the re-encrypted downlink data from the coordinator, and performs decryption on the received re-encrypted downlink data.

Further will be illustrated with regard to providing the re-encryption keys (e.g. the device re-encryption key corresponding to the device that the coordinator is associated with and the server re-encryption key corresponding to the AI server that the coordinator is associated with) in support of activating and performing secure data routing. It may be noted that the AI server that the coordinator is associated with is the AI server deployed at the AI server location that the coordinator is associated with. It may be also noted that the re-encryption keys may be provided to the coordinator only when secure data routing is activated.

Figure 6:
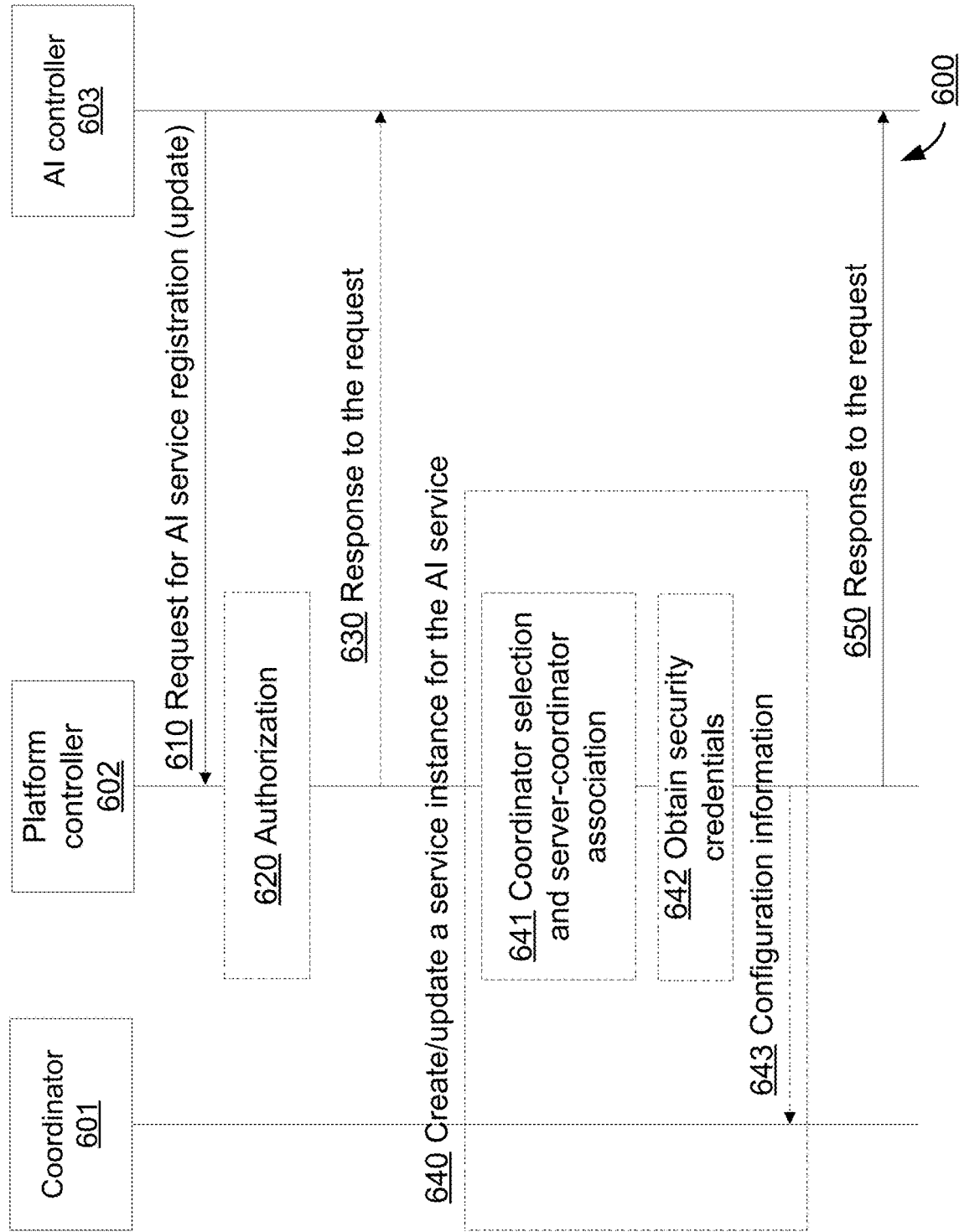
FIG. 6 illustrates, in a flow diagram, a procedure for AI service registration or AI service registration update, in accordance with embodiments of the present disclosure.
Figure 7:
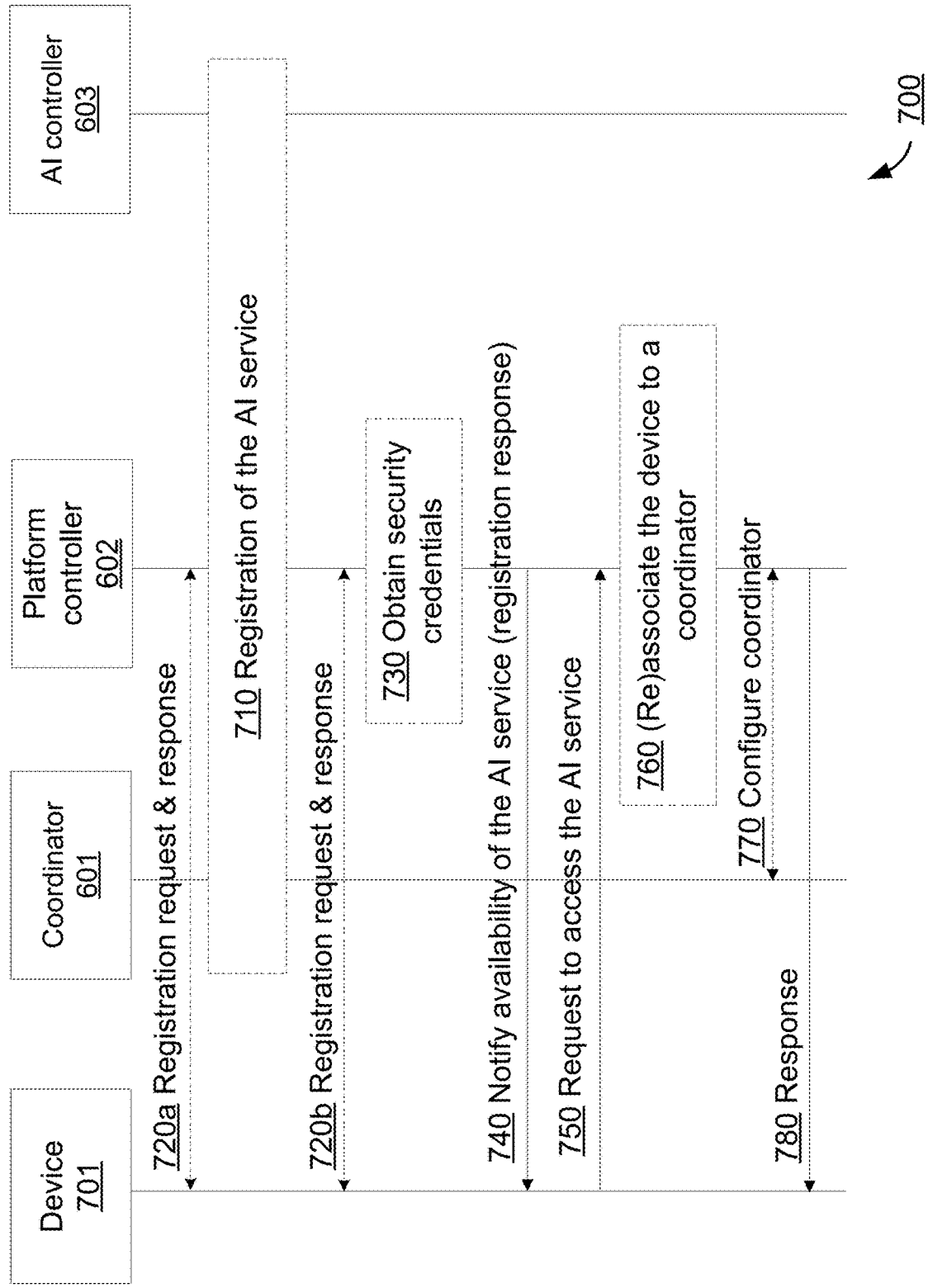
FIG. 7 illustrates, in a flow diagram, a procedure for notifying the service availability and requesting service access, in accordance with embodiments of the present disclosure.
Figure 8:
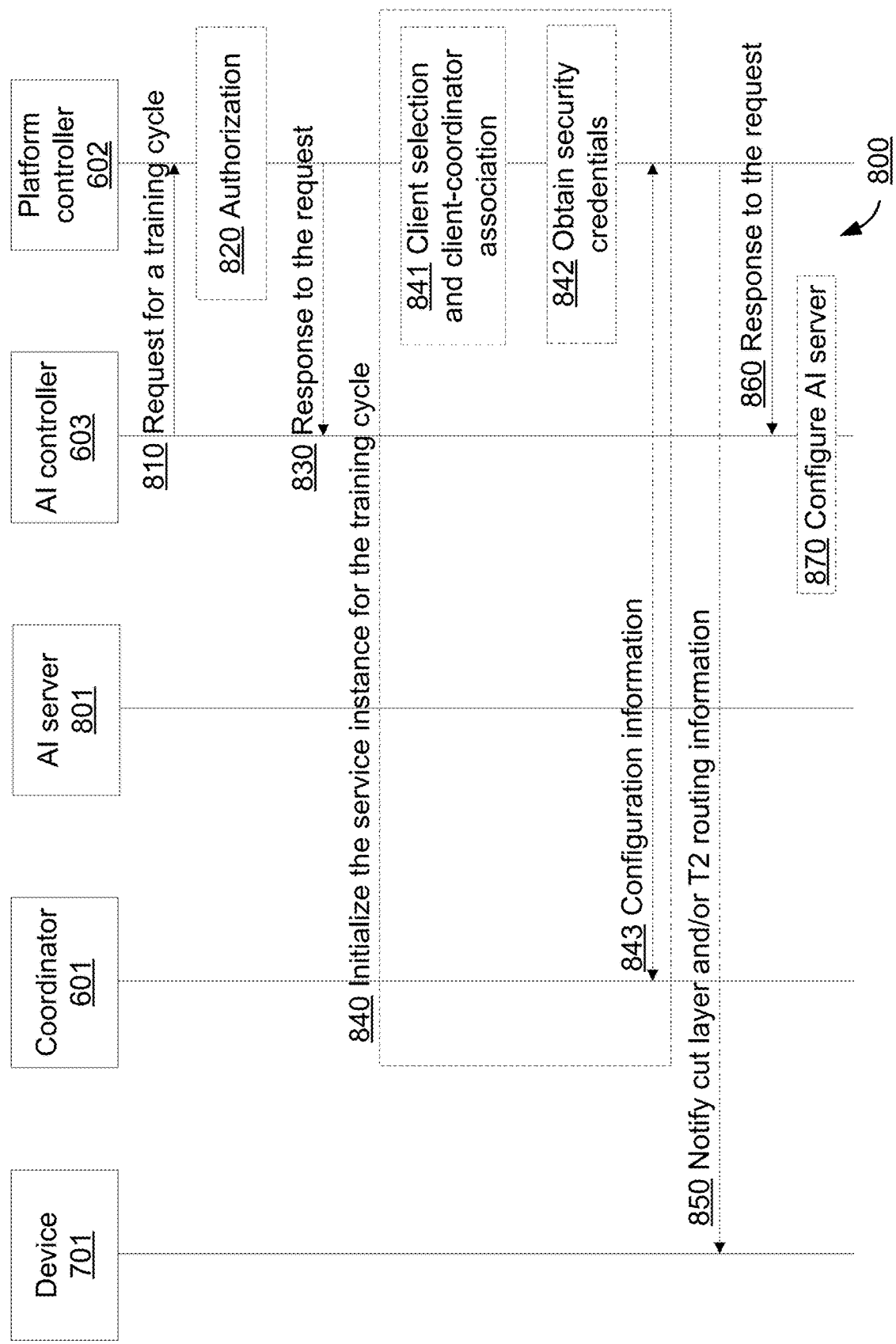
FIG. 8 illustrates, in a flow diagram, a procedure for preparing a training cycle for AI service, in accordance with embodiments of the present disclosure.

According to embodiments, the platform controller may provide one or more security credentials (e.g. device re-encryption key, server re-encryption keys) to the coordinator when configuring the coordinator (e.g. at step 643 in FIG. 6, step 770 in FIG. 7 or step 843 in FIG. 8). Each security credential may correspond to a device or an AI server. Each of the device and the AI server are associated with the coordinator.

Before providing the security credentials to the coordinator, the platform controller obtains the security credentials. In some embodiments, the platform controller obtains the security credentials from the AI controller, for example during service registration (e.g. at step 610 in FIG. 6) or during training cycle request (e.g. at step 810 in FIG. 8).

In some embodiments, the platform controller may obtain the security credentials from a separate network entity (e.g. at step 642 in FIG. 6, step 760 in FIG. 7 or step 842 in FIG. 8). The separate network component may be owned by a trusted party (or trust authority) that manages (e.g. generate, update, distribute, revoke) the security credentials. The trusted party is trusted by the AI service consumer (e.g. device), the AI service provider (e.g. AI controller, AI server) and the platform operator (e.g. platform controller, the coordinator).

In some embodiments, the platform controller may obtain the device re-encryption keys from the device(s). The platform controller may obtain the device re-encryption key corresponding to the device, during device registration (e.g. at step 720 in FIG. 7) or service request (e.g. at step 750 in FIG. 7).

In some embodiments, the device re-encryption keys are provided to the coordinator directly from the devices (e.g. not through the platform controller). For example, the device re-encryption keys are provided to the coordinator when the device accepts an invitation to a training cycle (e.g. at step 942 in FIG. 9).

As illustrated above, secure data routing may be needed for UL direction (e.g. data routing from a device to an AI server for providing input for AI model training or AI inference), for example, when a bottom cut is selected (e.g. the cut layer is selected at or below the input layer), and needed for DL direction (e.g. data routing from an AI server to a device for backpropagation or model parameters update, or return of AI inference result), for example, when a middle cut or a top cut is selected (e.g. the cut layer is selected above the input layer).

According to some embodiments, the platform controller may instruct the device to activate secure data routing when notifying the device of the cut layer selected for the device (e.g. step 850 of FIG. 8). Similarly, according to some embodiments, the platform controller may instruct the AI controller to activate secure data routing at an AI server location when notifying the AI controller of the cut layer selected for the AI server location (e.g. step 860 of FIG. 8) or when responding to service registration request (e.g. step 650 of FIG. 6). According to some embodiments, the platform controller may instruct the coordinator to activate secure data routing when providing configuration information to the coordinator (e.g. step 643 of FIG. 6 or 843 of FIG. 8 or 770 of FIG. 7). Some example of the configuration information includes information indicative of the cut layer selected and information about devices associated with the coordinator. When network components (e.g. device, coordinator, AI controller) are instructed (e.g. by being provided with or receiving an indication (or instruction)) to activate secure data routing, the network component activates secure data routing. The indication to activate secure data routing may be provided by or received from the platform controller. In some embodiments, the network component may be pre-configured to activate secure data routing. In some embodiments, an indication to deactivate secure data routing may be provided/sent to the network components, from the platform controller. In such case, the network components deactivate secure data routing upon receipt of the indication.

When secure data routing is activated, the network component (e.g. device, coordinator, AI controller) performs operations for secure data routing (e.g. encryption, re-encryption, and decryption) as illustrated elsewhere in the present disclosure. In some embodiments, the network component may perform secure data routing on selected data (e.g. UL data or DL data or both, as indicated in the indication to activate secure data routing, or as indicated in local configuration, or according to the cut layer information). For example, when the cut layer is a bottom cut, secure data routing is performed on UL data sent from the device toward the AI server via the coordinator. When the cut layer is a middle cut or bottom cut, secure data routing is performed on DL data sent from the AI server toward the device via the coordinator.

According to embodiments, the AI service supporting platform allows AI service providers to register their AI services via a control plane interface. Specifically, the AI service supporting platform allows network entities representing the AI service providers (e.g. AI controllers) to register their AI services via interface T3 (e.g. interface T3 403 in FIG. 4). The AI service provider offers one or more AI services, for example based on different AI models. The AI service provider may need to register at the platform several times, for example whenever the AI service provider offers a different AI model (or AI service). During registration, an AI controller, which represents the AI service provider and possibly controls the AI service, may provide the platform controller with information related to the AI service. The information provided by the AI controller may include (potential) locations of the AI service (i.e. (potential) locations of AI servers), information about each AI service location and information about the devices allowed to access the AI service.

The information provided by the AI controller may further include security credentials for each AI server location identified in the information and security credentials for each device identified in the information. The security credentials for AI server may include a server re-encryption key corresponding to the respective AI server location (or a server re-encryption key corresponding to an AI server deployed at the respective AI server location) for the AI service. The security credentials for AI server may be used, for example by a coordinator, to perform proxy re-encryption on an encrypted data when forwarding the encrypted data to the AI server for the AI service. The security credentials for the device may include a device re-encryption key corresponding to the respective device for the AI service. The security credential for device may be used, for example by a coordinator, to perform proxy re-encryption on an encrypted data when forwarding the encrypted data to the device for the AI service.

Based on the information provided by the AI controller, the platform controller may select coordinators and associate the selected coordinators with the AI server locations identified in the registration request. The selected coordinators and the AI server locations may be associated in a 'many-to-one' or 'one-to-one' fashion. It may be noted that 'one-to-one' is a special case of 'many-to-one'. Also, the platform controller may configure the service instance for the AI servers, for example by preparing or setting up connections between the selected coordinator(s) and the AI servers. This may include providing the selected coordinators with information of the AI service (e.g. the AI service ID) and information about AI servers associated with the AI service (e.g. routing information specified in the registration request or information associated with the routing information specified in the registration request).

When configuring the service instance, the platform controller may further provide each of the selected coordinators with the security credentials of the AI server and the security credentials of the devices allowed to access the AI service. The security credentials for the AI server may correspond to the AI server location associated with the coordinator. The security credentials may be received from the AI controller or obtained from a separate network component owned by a trusted party (or trust authority).

The AI service provider may update, for example via registration update, the information of the AI service or information about AI servers associated with the AI service. Also, the AI service provider may deregister the AI service from the platform by referring to the AI service ID. The information update may cause the (AI) service instance, if exists, to be modified or reconfigured. The platform controller notifies the clients about the registered AI service. According to their run-time status (e.g. loading, energy level, etc.), the clients can dynamically consent or refuse to participate in, or drop out of training AI model(s) for the AI service, by notifying the platform controller. In a consent notification, the client may provide its status information so that the platform controller can accordingly select the client or another client suitable for a training cycle.

FIG. 6 illustrates, in a flow diagram, the procedure 600 for AI service registration or AI service registration update, in accordance with embodiments of the present disclosure. The service registration or service registration update may be initiated by an AI controller. The AI controller may belong to or be controlled by the AI service provider. The AI controller represents the AI service provider.

Referring to FIG. 6, at step 610, the AI controller 603 sends a request to the platform controller 602 for registration of an AI service or for update of the existing AI service registration. The request may be referred to as registration request or registration update request, respectively. The request may include one or more of the followings.

(1) Information identifying the AI service (e.g. AI service identifier);
(2) Information about the AI model: The information about the AI model may indicate, for example, available cut layers, respective communication cost, and cost of transmitting model parameters for model aggregation. The available cut layers may be demonstrated using one or more references (e.g. in the form of identifiers) to pre-determined cut layers. The respective communication cost may be related to the structure of the cut layer (as illustrated elsewhere in this disclosure) and may be expressed or measured by amount of data to be transmitted or transferred.

(3) (Potential) locations of the AI service: These locations of the AI service may include, for example, a list of identifiers, names or network addresses. Each of these may identify a location that an AI server is or can be deployed for the AI service. When multiple AI servers are deployed at the same AI service location, the platform controller does not distinguish therebetween but can consider each AI server equivalently. Thus, the locations of the AI service can be mapped to a matching number of AI servers for the AI service and the identify of those AI servers from the platform's point of view. It may be noted that a location of the AI service may be referred to as an AI service location or an AI server location.

(4) Information about the devices allowed to access the AI service: The devices may be allowed to access the AI services for AL model training, AI inference or both. The information about the allowed devices may include information identifying the devices (e.g. device IDs, device group IDs or any other data indicative of devices), anticipated area for AI service location (e.g. zone IDs—identifier indicative of pre-configured zones), and allowed cut layer(s) (e.g. references to pre-determined cut layers). In some cases, the devices allowed to access the AI service may include any devices. In some cases, the devices allowed to access the AI service may include only devices having a valid subscription to the AI service. It may be noted that in some embodiments the information element (4) is optional.

(5) Security credentials for AI server locations: The AI server locations are the AI server locations identified in (3). The security credentials may include a server re-encryption key corresponding to each AI server location for the AI service. The security credentials for an AI server location may be used, for example by a coordinator associated with the AI server location, to perform proxy re-encryption on an encrypted data when forwarding the encrypted data to the AI server location for the AI service.

(6) Security credentials for devices: The devices may be those identified in (4). The security credentials for devices may include a device re-encryption key corresponding to each device for the AI service. The security credentials for a device may be used, for example by a coordinator associated with the device, to perform proxy re-encryption on an encrypted data when forwarding the encrypted data to the device for the AI service.

Upon receiving the request from the AI controller 603, the platform controller 602, at step 620, authorizes the registration request. This step is optional, for example, when the AI controller 603 is in the trust domain.

If the registration request is not authorized at step 620, the platform controller 602, at step 630, sends a response to the AI controller 603. The response indicates that the request is rejected. Upon delivery of the rejection response, the procedure 600 may terminate. On the contrary, if the registration request is authorized at step 620, delivery of the response indicating the request authorized is optional, and the procedure 600 proceeds to step 640. Step 630 would not be performed, if step 620 is not performed.

Based on the information in the registration request received from the AI controller 603, the platform controller 602, at step 640, creates a service instance or updates an existing service instance for the AI service. Step 640 includes sub-step 641 and sub-step 642, as illustrated below.

Based on the information received from the AI controller 603, the platform controller 602, at sub-step 641, selects one or more coordinators 601 and associates the selected coordinator(s) 601 with the AI server location(s) identified in the registration request. Each coordinator 601 is associated with a single AI server location, whereas each AI server location can be associated with one coordinator, multiple coordinators or even no coordinator.

Then, the platform controller 602, at sub-step 642, obtains security credentials for the AI service (e.g. server re-encryption keys for AI server locations and device re-encryption keys identified in the registration request). The AI server location may be associated with one or more coordinators 601. Sub-step 642 is optional if the security credentials have been included in the registration request (i.e. information elements (5) and (6) at step 610) or pre-configured in the platform controller 602.

According to embodiments, the platform controller 602 may obtain the security credentials from a separate network entity. For this, the platform controller 602 may send a request to the separate network entity and receive a response therefrom. The request sent to the network entity is indicative of the AI service (e.g. using the AI service identifier) and includes information indicative of the AI server locations and/or the devices. The response from the network entity includes the security credentials corresponding to each AI server location for the AI service. The separate network component may be owned by a trusted party or trust authority (e.g. a government agency) that manages (e.g. generate, update, distribute, revoke) the security credentials for the device, the AI controller 603 and the platform provider (e.g. platform controller 602 and coordinators 601). The trusted party or trust authority is trusted by the AI service consumer (e.g. device), the AI service provider (e.g. AI controller 603, AI server) and the platform operator (e.g. platform controller 601, the coordinator 601).

Then, at sub-step 643, the platform controller 602 provides configuration information to each of the coordinators 601 selected at sub-step 641. The configuration information may include information identifying the AI service (e.g. as provided by the AI controller 603 in step 610). The configuration information may further include the security credentials corresponding to the AI server location that the coordinator 601 is associated with. The configuration information may further include the security credentials corresponding to the devices allowed to access the AI service. The security credentials may be provided by the AI controller 603 to the platform controller 602 at step 610, obtained by the platform controller 602 at sub-step 642, or pre-configured at the platform controller 602.

At step 650, the platform controller 602 responses to the AI controller 603 for the registration (or registration update) request received at step 610. The response sent to the AI controller 603 may include information identifying the AI service (e.g. an AI server identifier). This information may be identical to the information identifying the AI service at step 610 (i.e. information element (1) at step 610). In some embodiments, the information identifying the AI service may be generated by the platform controller 602 if the registration request at step 610 does not include this (note: the information may be generated only for the case of a new service registration, but may be not for the case of updating an existing service).

After step 650, the platform controller 602 may notify devices of the AI service, for example at step 740 in FIG. 7. The notification may include information identifying the AI service (e.g. the AI service identifier). The platform controller 602 may notify only devices that are allowed to access the AI service as indicated in the request at step 610.

FIG. 7 illustrates, in a flow diagram, the procedure 700 for notifying the service availability and requesting service access, in accordance with embodiments of the present disclosure. According to embodiments, step 720 (relating to the registration response) and step 740 may be integrated within a device registration procedure. Steps 750 to 780 may be integrated within a service request procedure. Step 740 (when not being implemented during the registration response) can be integrated within a service availability notification procedure. It may be noted that each of the device registration procedure, the service availability notification procedure and the service request procedure are independent. In the procedure 700, the device 701 may provide the platform controller 701 with security credentials corresponding to the device 701 (e.g. at steps 720 and 750). The security credentials may include a device re-encryption key for the device 701. The security credentials are used by the coordinator 601 (e.g. a coordinator associated with the device 701 for the AI service) to perform re-encryption on an encrypted data when forwarding the encrypted data to the device 701.

Referring to FIG. 7, at step 710, the AI controller 603 registers an AI service or update an existing AI service registration at the platform controller 602, for example via the procedure 600 illustrated in FIG. 6. Through step 710, the AI controller 603 can indicate to the platform controller whether the device 701 is allowed to access the AI service. Further, the platform controller 602, at step 710, may obtain security credentials (e.g. device re-encryption key) corresponding to the device 701 to support secure data routing. After step 710, the AI service is available for use or access by the devices 701.

At step 720, the device 701 sends a registration request to the platform controller 602 to be registered at the platform controller 602. The registration request may be referred to as device registration request. The device registration request includes information identifying the device 701. The platform controller 602 authorizes the device 701 to be connected to the platform, for example according to the device 701's subscription to the AI platform. The device registration request may further include security credentials (e.g. device re-encryption key) corresponding to the device 701. Step 720 can occur before or after step 710 as illustrated in FIG. 7. In other words, the device registration process can occur either as step 720a or step 720b. If the device registration process is taking place at step 720a, the platform controller 602 may send a response message (e.g. a registration response) to the device 701, before step 710. The response message may include information indicating whether the device registration request is accepted (i.e. whether the device 701 is authorized to connect to the platform) before the step 710. It may be noted that the response message is not shown in FIG. 7.

At step 730, the platform controller 602 obtains security credentials corresponding to the device 701 for the AI service (e.g. device re-encryption key). In this step, the platform controller 602 may interact with a separate network entity and obtain the security credentials from the separate network entity. Step 730 may be similar to sub-step 642 in FIG. 6. Step 730 may not be performed if the security credentials are already available at the platform controller 602 (e.g. the platform controller 602 received in an early step or the security credentials are pre-configured at the platform controller 602). In some embodiments, the platform controller 602 is not configured to perform step 730 or is configured not to perform step 730. In some embodiments, step 730 may be performed after step 740 and before step 750. In some embodiments, step 730 may be performed after step 750 and before step 760. In some embodiment, step 730 may be performed after step 760 and before step 770.

At step 740, the platform controller 602 notifies the device 701 about availability of the AI service registered at step 710. This notification may include information identifying the AI services (e.g. AI service identifier). In this step, the platform controller 602 may further notify the device 701 about availability of other AI services, by including the identifiers of those AI services in the notification. In some embodiments, at this step the platform controller 602 may also provide to the device 701 on a per AI service basis information (e.g. an indication) indicative of whether and for what data to activate secure data routing for the AI service. Step 740 can be performed in response to step 710 or step 720. If step 730 occurs in response to step 720 (either 720a or 720b), the AI service availability may be provided to the device 701 in a registration response message (e.g. integrated with a response to the device registration request at step 720).

At step 750, the device 701 sends a request for accessing the AI service to the platform controller 602. The request may be referred to as service request. The service request sent by the device 701 may include information identifying the AI service (e.g. the AI service identifier). The service request may also indicate the purpose of the access (e.g. whether the access is for AI model training, for AI inference or for both). When the service request indicates the purpose of the access is for AI model training, the device 701 would contribute to or participate in the AI model training for the AI service. In this case, the service request may be also referred to as consent notification, having the functionality of notifying the platform controller 602 of the device 701's consent.

In various embodiments, the message at step 750 may further include security credentials corresponding to the device 701 (e.g. device re-encryption key) for the AI service. In some embodiments, the security credentials are included in the message only when an indication to activate secure data routing is provided by the platform controller 602 at the step 740.

Upon receiving the request at step 750, the platform controller 602, at step 760, associates or re-associates the device 701 with the coordinator 601 in the service instance corresponding to the AI service. In this step, the platform controller 602 may select a cut layer for the device 701. The platform controller 602 may select the same cut layer for the device 701 and other devices associated with the coordinator 601. Step 760 is optional for example if the device 701 has already been associated with a suitable coordinator.

When the device 701 is associated (or re-associated) with the coordinator 601, the platform controller 602, at step 770, configures the coordinator 601 that the device 701 is associated with. It may be noted that step 770 is optional. In this step, the platform controller 602 provides the security credentials corresponding to the device 701 for the AI service (e.g. device re-encryption key) to the coordinator 601. The security credentials may be pre-configured at the platform controller 602 or obtained by the platform controller 602 at step 710, 720, 730 or 750. In some embodiments, the platform controller 602 may provide the security credentials to the coordinator 601 only when secure data routing is needed or activated.

At step 780, the platform controller 602 sends a response to the device 701. The response indicates whether the request for the AI service access made at step 750 is accepted. The response may include information (e.g. a cut layer ID) indicating the cut layer selected for the device 701. According to the information, the device 701 may contribute to or participate in AI model training for the AI service. In some embodiments, the response includes information (e.g. an indication) indicative of whether to activate secure data routing, and the device 701 activates secure data routing according to this indication. The indication may further indicate what data to activate secure data routing for, i.e. what data (UL data or DL data or both) secure data routing should be performed for, and the device 701 performs secure data routing accordingly for the indicated data.

According to embodiments, after the AI service is registered, the AI controller may request for a training cycle (i.e. a cycle of AI model training) for the AI service. The request can be made by sending a request for a training cycle to the platform controller via interface T4 (e.g. step 810 in FIG. 8). The request for AI model training cycle can be made upon necessity, for example when initially building the AI model or when identifying AI model accuracy degradation and improving AI model accuracy. Upon request, the platform controller performs training cycle initialization/preparation. For example, the platform controller may initialize or prepare the service instance for the AI training cycle (e.g. step 840 in FIG. 8). During the initialization/preparation (e.g. step 840 in FIG. 8), the platform controller may select clients to join the training cycle for the AI service (e.g. step 841 in FIG. 8). The selected clients may participate in or contribute to the AI model training within the training cycle.

In various embodiments, the platform controller selects clients according to their consent to contribute to the AI model training. The clients' consent may be received for example at step 750 of FIG. 7. In some embodiments, the platform controller may select clients only from the devices that have consented to contribute to the AI model training. The platform controller may associate or re-associate the selected clients with the coordinators in the service instance (e.g. step 841 in FIG. 8). The platform controller can also select a cut layer for each of the selected clients (e.g. step 841 in FIG. 8). The platform controller selects the same cut layer for clients associated with the same coordinator. In some embodiments, the platform controller may obtain security credentials corresponding to the selected clients (e.g. device re-encryption key) from a (separate) network entity that manages or controls the security credentials of the device (e.g. step 840 in FIG. 8).

Figure 9:
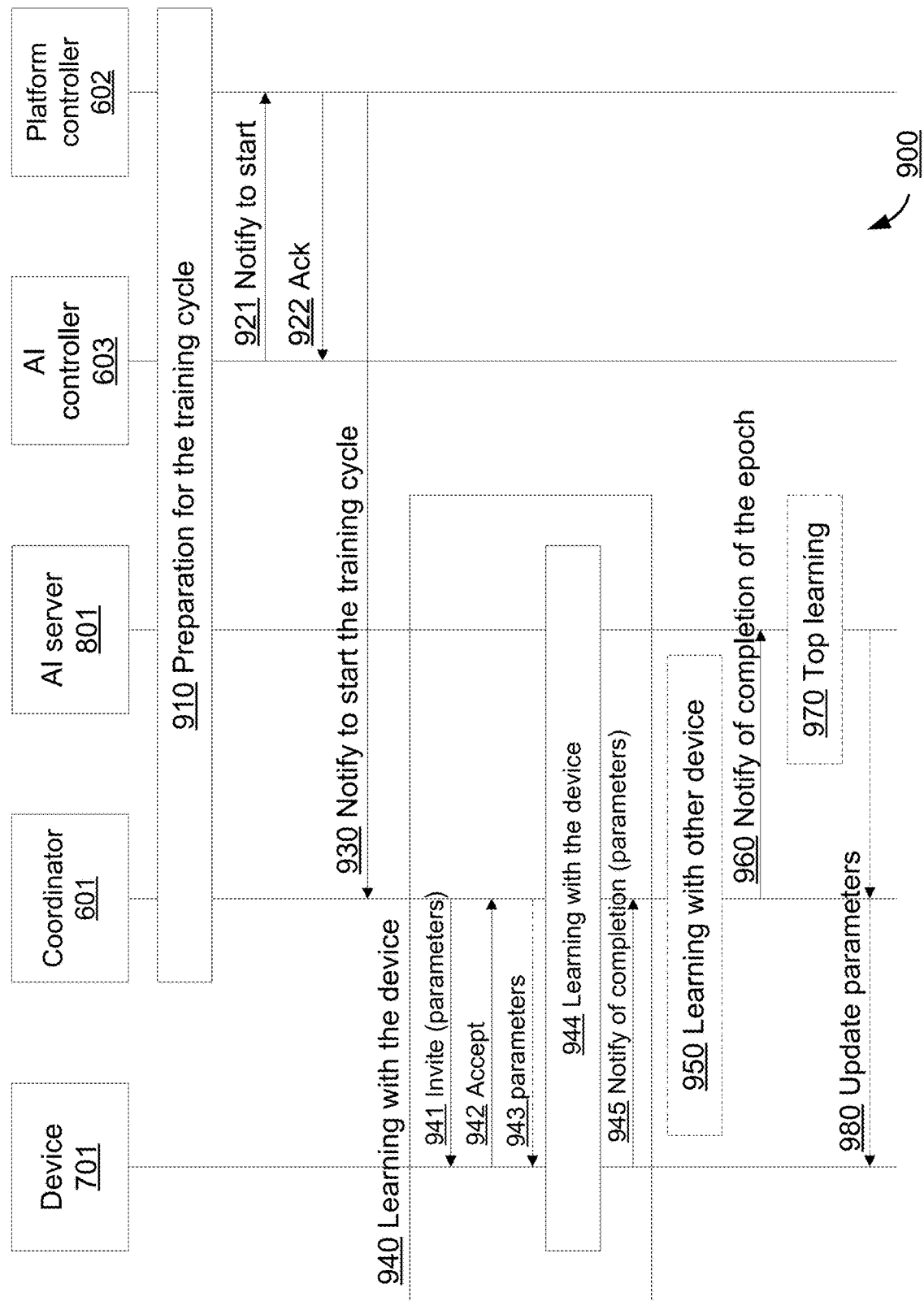
FIG. 9 illustrates, in a flow diagram, a procedure for executing a training cycle for AI service, in accordance with embodiments of the present disclosure.

The platform controller may configure each coordinator by providing configuration information to the coordinator (e.g. sub-step 942 in FIG. 9). The configuration information may include the cut layer selected for clients associated with the coordinator. If the security credentials (e.g. device re-encryption key, server re-encryption key) are available at the platform controller, the configuration information may further include security credentials (e.g. device re-encryption key) corresponding to each of the devices associated with the coordinator. The configuration information may further include security credentials (e.g. server re-encryption key) corresponding to the AI server location that the coordinator is associated with. The configuration information may further include information (e.g. an indication) indicative of whether to activate secure data routing and activating secure data routing for what type of data (e.g. UL data (from device to server), DL data (from server to device), or both) at the coordinator. The coordinator activates or does not activate (or deactivates) secure data routing according to this information.

According to embodiments, the platform controller notifies each of the selected devices about the cut layer selected for the device (e.g. via the step 950 in FIG. 9). The devices are selected during the initialization or preparation of the training cycle. In various embodiments, the notification includes information representing the selected cut layer, for example a reference or an ID indicative of one of the pre-defined cut. The client can participate in or contribute to the AI model training according to the information representing the selected cut layer. The notification may further include information (e.g. an indication) indicative of whether and for what data (e.g. UL data (from device to server), DL data (from server to device), or both) to activate secure data routing at the client. The client activates or does not activate (or deactivates) secure data routing for the indicated data according to this information. In some embodiments, the notification is not sent from the platform controller but from the coordinator, when the coordinator invites the client to join the training cycle (e.g. via sub-step 941 in FIG. 9). In other words, the notification is sent to the device as part of the invitation by the coordinator. The coordinator may obtain information indicative of the cut layer from the platform controller, for example via sub-step 843 in FIG. 8.

According to embodiments, some coordinators in the service instance may be associated with no client. In such case, the AI server locations associated with those coordinators will not be used for the current AI training cycle, as no data will be sent to them. AI server locations associated with (other) coordinators that are associated with clients will be used for the current training cycle. The platform controller notifies the AI controller of the AI server locations that will be used for the current training cycle. For example, information indicative of the AI server locations (e.g. a list of location IDs, names or addresses) may be provided to the AI controller by the platform controller as part of the notification. In the notification, the platform controller also provides, on a per AI server location basis, information about the cut layer associated with the AI server location (e.g. the cut layer selected for clients associated with the coordinator that the AI server location is associated with). In some embodiments, in the notification the platform controller further provides, on a per AI server location basis, information (e.g. an indication) indicative of whether and for what data (e.g. UL data (from device to server), DL data (from server to device), or both) to activate secure data routing at the AI server location. The platform controller may notify the AI controller using the response sent to the AI controller for the training cycle request (e.g. step 860 in FIG. 8). In other words, the platform controller may integrate the notification into the response. Then, the AI controller can provide information in the notification, e.g. the cut layer information and the information (e.g. an indication) indicative of whether and for what data (e.g. UL data (from device to server), DL data (from server to device), or both) to activate secure data routing, to the respective AI servers (e.g. step 870 in FIG. 8), and the AI servers will use these information to perform the AI model training in the current training cycle. Then, the AI server performs model training with the devices in accordance with the cut layer information provided by the AI controller. Also, according to the information (e.g. an indication) indicative of whether and for what data (e.g. UL data (from device to server), DL data (from server to device), or both) to activate secure data routing, the AI server accordingly activates or does not activate (or deactivates) secure data routing for the indicated data.

According to embodiments, when the AI servers are ready, the AI controller can notify the platform controller that the training cycle can be started (e.g. sub-step 921 in FIG. 9). Upon receiving the notification, the platform controller will start the (AI model) training cycle. When the platform controller starts the training cycle, it may notify the coordinators to start the training cycle at the bottom learning level (e.g. step 930 in FIG. 9). Upon receiving the notification from the platform controller, each coordinator invites their associated clients to the training cycle (i.e. to join the training cycle). The coordinators may send invitations or notifications to the clients (e.g. sub-step 941 in FIG. 9). The invitation sent by the coordinators may include parameters related to the (AI) model training, such as information indicative of the cut layer. In some embodiments, the invitation sent by the coordinators may further include information (e.g. an indication) indicative of whether and for what data to activate secure data routing. When a top or bottom cut is selected (e.g. the cut layer is selected at or above the output layer, or at or below the input layer), the coordinator may invite all associated clients at the same time. According to embodiments, any clients receiving the invitation can accept or refuse the invitation. If a client accepts the invitation, the client, based on the parameters included in the invitation, performs the model training with the AI server (location) associated with the coordinator via the coordinator. According to the information indicative of whether and for what data to activate secure data routing included in the invitation, the client activates or does not activate (or deactivates) secure data routing for the indicated data.

According to embodiments, when the training cycle completes between the clients and the AI, the coordinator notifies the AI server of the training cycle completion (e.g. via step 960 in FIG. 9). Upon receiving the notification, the AI server performs top learning level following the FL procedure using the trained local AI model (e.g. step 970 in FIG. 9). The top learning level of the training cycle may happen in the AI application layer, between AI servers, without involving platform components. After a training cycle completes, the AI controller can request for, and trigger to start a new training cycle. The training cycles continue until certain termination condition is met (e.g. model convergence).

FIG. 8 illustrates, in a flow diagram, a procedure 800 for preparing a training cycle for AI service, in accordance with embodiments of the present disclosure. Referring to FIG. 8, the AI controller 603, at step 810, requests for a training cycle for the AI service. The AI controller 603 may send a request for a training cycle for the AI service to the platform controller 602. The request may include information identifying the AI service (e.g. an AI service identifier), information related to the model training (e.g. learning rate, batch size, number of epochs for bottom learning level), or both.

Upon receiving the request, the platform controller 602, at step 820, authorizes the request. This step can be optional, for example, when the AI controller 603 is in the trust domain (i.e. trusted by the platform controller 602).

If the request is not authorized at step 820, the platform controller 602, at step 830, sends a response to the AI controller 603. The response indicates that the request is rejected. Upon delivery of the rejection response, the procedure 800 may terminate. On the contrary, if the registration request is authorized at step 820, delivery of the response indicating the request authorized is optional, and the procedure 800 proceeds to step 840. Step 830 would not be performed, if step 820 is not performed.

The platform controller 602, at step 840, initializes or prepares the service instance corresponding to the AI service for the training cycle, as identified in the request in at step 810. Step 840 includes sub-step 841 to sub-step 843, as illustrated below.

Based on the information received from the AI controller 603, the platform controller 602, at sub-step 841, may select clients 701, associate the selected clients 701 with the coordinator(s) 601 in the service instance, and select a cut layer for the selected clients 701. In various embodiments, the platform controller 602 may select from the devices allowed to access the AI service. The devices allowed to access the AI service may be indicated by the AI controller 603, for example in the registration (update) request at step 610 of FIG. 6. When selecting client(s) 701, the platform controller 602 may also take into account the clients' consent, for example as is provided by the clients 701 at step 750 of FIG. 7. In some embodiments, the platform controller 602 only selects clients that are allowed to access the AI service and have consented to the model training for the AI service. When selecting the cut layer, the platform controller 602 selects among the cut layers that are available (e.g. allowed to use) to the clients 701, as indicated by the AI controller 603. The available cut layers may be indicated in the registration request (or registration update request) at step 610 of FIG. 6.

At sub-step 842, the platform controller 602 obtains security credentials for the AI service, the security credentials corresponding to each of the AI servers (e.g. server re-encryption key) and/or device re-encryption key corresponding to each of the selected devices. In some embodiments, the platform controller 602 may interact with a (separate) network entity to obtain the security credentials. It may be noted that sub-step 842 is similar to the sub-step 642 in FIG. 6. Sub-step 842 is optional if the platform controller 602 has already acquired the security credentials at other step (e.g. service registration, service request, device registration) or has been pre-configured with the security credentials.

At sub-step 843, the platform controller 602 provides configuration information to one or more coordinators 601 participating in the training cycle. Configuration information may be provided for each of the one or more coordinators in this step. For a coordinator 601, the configuration information may include information about the clients 701 associated with the coordinator 601 (e.g. identifiers or network addresses of the clients or a client group ID) and information about the cut layer selected for the clients 701 (e.g. information indicative of the cut layer such as a reference to a pre-defined cut layer or a cut layer ID; information indicative of whether the cut layer is a top cut, a bottom cut or a middle cut).

The configuration information provided by the platform controller 602 may further include information (e.g. an indication) indicative of whether and for what data (e.g. UL data, DL data, or both) to activate secure data routing. The configuration information may further include the security credentials corresponding to the AI server location that the coordinator 601 is associated with (e.g. server re-encryption key). The configuration information may further include the security credentials corresponding to the devices 701 that are associated with the coordinator (e.g. device re-encryption keys). In some embodiments, the security credentials may be included in the configuration information only when the configuration information (e.g. indication of whether to activate secure data routing in the configuration information) indicates to activate secured data routing.

Upon receiving the configuration information from the platform controller 602, the coordinator 601, still at sub-step 843, may send a response to the platform controller 602. The response may include acknowledgment for receipt of the configuration information.

The platform controller 602, at step 850, sends a notification to each of the clients 701 selected at sub-step 841. The notification sent to each client 701 may include information indicative of the cut layer selected for the client 701 (e.g. a reference to a pre-defined cut layer or a cut layer ID). The notification may further include information (e.g. an indication) indicative of whether and for what data to activate secure data routing. It may be noted that step 850 is optional.

The platform controller 602, at step 860, responds to the AI controller 603 for the request received at step 810. The response includes information indicative of AI server locations where the training cycle will occur. The AI server locations are those that are associated with the coordinator 601. It may be noted that the coordinator 601 is associated with one or more clients 701. It may be also noted that there are one or more AI server locations. The information may include identifiers, names or addresses of the AI server locations. The response may further include, for each AI server location, information indicative of a cut layer to be used for the training cycle at the AI server location (e.g. a reference to a predefined cut layer or a cut layer ID). The cut layer corresponds to the cut layer selected for the clients 701 associated to the coordinator 601 associated with (or corresponding to) the AI server location. The response may further include, for each AI server location, information (e.g. an indication) indicative of whether and for what data to active secure data routing at the respective AI server location.

After receiving the response from the platform controller 602, the AI controller 603 may configure one or more AI servers 801 at the AI server locations based on the information included in the response. For example, the AI controller 603 notifies each of the AI servers 801 about the respective cut layer information. It may be noted that the AI server 801 may be identified in the response and may perform model training based on the cut layer information and information (e.g. an indication) indicative of whether and for what data to activate secure data routing included in the response.

In some embodiments, AI server registration procedure (e.g. procedure 600 in FIG. 6) and training cycle request procedure (e.g. procedure 800 in FIG. 8) may be integrated. For example, the registration procedure 600 is integrated into the training cycle request procedure 800 as follows. Each of steps 610 to 640 (including sub-steps 641 to 643) of FIG. 6 may be integrated with steps 810 to 840 (including sub-steps 841 to 843) of FIG. 8, respectively. Further, step 650 of FIG. 6 may be integrated with step 860 of FIG. 8. Step 850 of FIG. 9 may be still performed in the integrated procedure. Step 850 of FIG. 9 is similar to the step 740 in FIG. 7 in that these steps indicate availability of the AI server(s). In other words, at step 850 of FIG. 9, the platform controller 602 notifies the device 701 about availability of the AI server(s).

In the integrated procedure, server instance creation and training cycle initialization may be performed at the same time for the AI server. According to embodiments, such integration of the procedure can reduce signaling overhead and delay.

FIG. 9 illustrates, in a flow diagram, a procedure 900 for executing a training cycle for AI service, in accordance with embodiments of the present disclosure. According to embodiments, when a training cycle is prepared for the AI service, the AI controller can notify the platform controller that the training cycle can be started. Upon the notification, the platform controller may instruct coordinators to start the training cycle. For this, the platform controller may send a notification to each of the coordinators that are associated with clients for the AI service. The coordinators may be included in the service instance of the AI service. According to the notification, each of the coordinators invites its associated devices for the AI service to the training cycle. The devices then train the AI model at the AI server associated with the AI service, through the coordinator.

When inviting its associated devices, the coordinator may provide the devices with information identifying the cut layer selected for the devices. The coordinator may further provide the devices with information indicative of whether and for what data to activate secure data routing. The coordinator may receive the information indicative of whether and for what data to activate secure data routing from the platform controller when the platform controller configures the coordinator, for example during training cycle request procedure, service registration procedure or service request procedure. Then, according to the information provided by the coordinator, the associated devices, via the coordinator, train the AI model at the AI server associated with the coordinator. During the training, the coordinator may route data between the devices and the AI server such that the devices and the AI server do not know about each other. The procedure 900 for executing a training cycle for AI service is further illustrated below.

Referring to FIG. 9, the AI controller 603, at step 910, triggers the platform controller 602 to prepare the service instance for the training cycle, for example via the training cycle request procedure 800 (i.e. steps 810 to 860) illustrated in FIG. 8. The service instance includes the coordinator 601. Afterwards, the AI controller 603 may configure the AI servers 801 based on the information received from the platform controller 602 for the training cycle. For example, the AI controller 603 may inform each of the AI servers 801 about the cut layer to be used in the training cycle (e.g. as described in the embodiment associated with FIG. 8, after step 860).

When the AI servers 801 are configured, the AI controller 603, at sub-step 921, notifies the platform controller 602 to start the training cycle for the AI service. For example, the AI controller 603, at sub-step 921, may send a message to the platform controller 602 to start the training cycle. The message sent by the AI controller 603 may include information indicative of the AI service (e.g. AI service identifier). The message may further include information indicative of the AI controller 603 (e.g. AI controller identifier). The platform controller 602 may respond, at sub-step 922, to the AI controller 603 in order to acknowledge the receipt of the notification.

At step 930, according to the notification received in sub-step 921, the platform controller 602 notifies the coordinator 601 to start the training cycle for the AI service. For example, the platform controller 602 may send a message to the coordinator 601 to start the training cycle. The message sent by the platform controller 602 may include information indicative of the AI service (e.g. AI service identifier). When notifying the coordinator 601, the platform controller 602 may provide the coordinator 601 with the configuration information described in sub-step 843 of FIG. 8, if the information is not yet provided to the coordinator 601 (e.g. if not provided to the coordinator at sub-step 843 of FIG. 8 or at sub-step 643 of FIG. 6). The configuration information may be included in the message that the platform controller 602 sends to the coordinator 601.

At step 940, the coordinator 601 invites the client 701 to the training cycle. Upon the invitation, the device 701 contributes to the training. Step 940 includes sub-step 941 to sub-step 945, as illustrated below At sub-step 941, according to the notification received in step 930, the coordinator 601 invites the client 701 to the training cycle. For this, the coordinator 601 may send a message to the client 701. The client 701 is associated with the coordinator 601 as indicated in the configuration information. As stated above, the configuration information may be received from the platform controller 602 at step 830 or sub-step 843 of FIG. 8 or at sub-step 643 of FIG. 6. The invitation (e.g. message sent from the coordinator 601 to the client 701) may include information indicative of the cut layer selected for the client 701. In some embodiments, the invitation may further include information indicative of whether to activate secure data routing.

At sub-step 942, the client 701 accepts the invitation and connects to the coordinator 601. The client 701 may send a message to the coordinator 601 indicating that it accepts the invitation (e.g. the client 710 agrees to join the training cycle or agree to participate in the model training in the training cycle). In this step, the client 701 may provide the coordinator 601 with security credentials corresponding to the client 701 (e.g. device re-encryption key). In some embodiments, the client 701 provides the security credentials only when secure data routing is activated, as indicated at sub-step 941.

At sub-step 943, the coordinator 601 provides the device 701 with parameters related to the training cycle. It may be noted that sub-step 943 is optional if the parameters have been provided to the device 701, for example at step 941. Further, sub-step 943 is optional, for example, if a bottom cut is selected (e.g. the cut layer is selected at or below the input layer). In some embodiments, sub-step 943 is optional, for example, if a top cut is selected (e.g. the cut layer is selected at or above the output layer) as the parameters have been pre-configured in the device 701.

At sub-step 944, the device 701 participates in or contributes to the AI model training for the AI service. For the AI model training, the device 701 may use its local data and the parameters related to the training. The parameters may be received from the coordinator 601 (e.g. sub-step 941 or 943). At sub-step 944, the AI server 801 performs model training or learning with the device 701 via the coordinator 601, without knowing about the device 701 (e.g. information indicative of the device's identity). It may be noted that training, model training and learning refer to the same process of establishing, improving or maintaining the AI model in this disclosure.

If a bottom cut is selected (e.g. the cut layer is selected at or below the input layer), the device 701 sends raw training data (i.e. training data in the original form) to the coordinator 601. The coordinator 601 forwards the data to the AI server location associated with the coordinator 601. In this case, the learning process occurs, in a centralized form, at the AI server location (e.g. the AI server 801 deployed at the AI server location). The AI server 801 trains the AI model using the raw training data received from the coordinator 601. It may be noted that this case for the bottom cut corresponds to CL illustrated above.

When a top cut is selected (e.g. the cut layer is selected at or above the output layer), the device 701 locally trains a local version of the AI model using its local data and sends the parameters of the local AI model to the coordinator 601. The coordinator 601 forwards the parameters to the AI server location associated with the coordinator 601. In this case, the learning process occurs, in a localized form, at the device 701. Local model parameters from other clients may be received, via the coordinator 601, at the AI server location, for example the AI server 801 deployed at the AI server location. The AI server 801 aggregates or combines the local model parameters in order to create or update the parameters of the AI model. It may be noted that this case for the top cut corresponds to FL illustrated above.

If a middle cut is selected (e.g. the cut layer is selected between the output and the input layer), the learning process occurs, in a semi-distributed form, at the device 701 and also at the AI server location (e.g. the AI server 801 deployed at the AI server location). It may be noted that the case for the middle cut corresponds to SL illustrated above. The learning process for the middle cut may comprise multiple stages. In each stage, the device 701 trains one or more local components of the AI model (i.e. the partition(s) at or below the cut layer) using local data. The device 701 sends the AI model parameters to the coordinator 601, and then the coordinator 601 forwards the received parameters to the AI server location (e.g. AI server 801 deployed at the AI server location). The AI model parameters are related to the cut layer and are resulted from the local AI model training. Then, using the AI model parameters received, via the coordinator 601, from the device 701, the AI server 801 trains the other component(s) (i.e. the partition(s) above the cut layer). The AI server 801 also sends backpropagation-related parameters (e.g. gradients) to the coordinator 601 which forwards the backpropagation-related parameters to the device 701. The device 701 may use the received backpropagation-related to adjust the model parameters in the local component of the model (i.e. the partition(s) at or below the cut layer). After the local parameters are adjusted, the learning process proceeds to the next stage.

According to embodiments, when secure data routing is activated, the interaction between the device 701 and the AI server 801 via the coordinator 601 may be implemented through the procedure 500 for secure data routing illustrated in FIG. 5.

At sub-step 945, the device 701 sends a message to the coordinator 601, indicating that the device 701 finishes the model training for that training cycle. It may be noted that sub-step 945 is optional.

At step 950, the coordinator 601 performs the learning process (e.g. model training illustrated at step 940) with other device(s) associated with the coordinator 601 for the AI service. In some embodiments, the coordinator 601 may perform step 950 in parallel with step 940, for example when a top cut or a bottom cut is selected for the cut layer. In some embodiments, the coordinator 601 may perform step 950 after step 940, for example when a middle cut is selected for the cut layer. In this case, when other device(s) receives the model parameters related to the training cycle (e.g. sub-steps 941 and 943 but with other device(s)), the coordinator 601 may provide the other device(s) with the parameters received from the device 701 at sub-steps 945. This is to realize the parameters transferred from the device 701 to the other device(s).

According to embodiments, when performing step 950, the coordinator 601 ensures k-anonymity provision. As such, the coordinator 601 invites at least k different devices to the training cycle to ensure, for example, confidentiality and integrity. The value k may be pre-configured at the coordinator 601 or received, by the coordinator 601, from the platform controller 602 during service registration (e.g.

sub-step 643 in FIG. 6). The coordinator 601 may not invite a device to the same training cycle multiple times.

At step 960, the coordinator 601 notifies the AI server 801 that the number of epoch has been reached. The number of epoch is reached, for example, when each of the devices associated with the coordinator 601 is invited to the training cycle the same number of times. The number of epoch may be pre-configured at the coordinator 601 or received by the coordinator 601 from the platform controller 602 during service registration procedure (e.g. sub-step 643 in FIG. 6) or training cycle request procedure (e.g. sub-step 843 in FIG. 8). It may be noted that step 960 may be optional when a top cut or a bottom cut is selected for the cut layer.

At step 970, the AI server 801 performs top learning level, followed by FL procedure with other AI servers. It may be noted that step 970 may be optional when a top cut is selected for the cut layer.

If a top cut is selected for the cut layer, the AI server 801, at step 980, sends updated parameters of the AI model to the coordinator 601. Then, the coordinator 601 forwards the received parameters to the client 701. The parameters include parameters of the AI model such as gradients. Step 980 may be in the form of a response to the message (which includes the parameters of the local AI model) received from the client 701 at sub-step 945. Secure data routing may be applied to this step to protect data privacy.

According to embodiments, when proxy re-encryption is applied, a coordinator, the intermediary network entity, is not able to read or decrypt the data communicated between the client and the AI server that are associated with the coordinator. When the AI controller provides server re-encryption keys during service registration (update), the re-encryption keys are provided before runtime (i.e. before AI model training or AI inference starts), thereby saving runtime signaling and reducing runtime delay. In other words, platform response time is reduced, for example as it requires less time to respond. It may be noted that registration (update) is expected to happen less often than training cycle request.

According to embodiments, when server re-encryption keys are provided by the AI controller during training cycle request, the keys may be provided dynamically, thereby allowing dynamic key update. This approach provides flexibility for communication overhead.

According to embodiments, when device re-encryption keys are provided by the AI controller (during service registration or training cycle request), less device signal is required thereby reducing energy consumption on the device side. When device re-encryption keys are provided by the device (during service request or invitation accept), it allows timely key update to the platform thereby reducing workload on the AI-controller-side with regard to device key management (e.g. obtaining the keys and updating the keys to the platform).

According to embodiments, when the re-encryption keys (server related or device related) are obtained by the coordinator from a separate network entity that manages the keys, the cost associated with communication between the device and the AI controller may be decreased.

Figure 10:
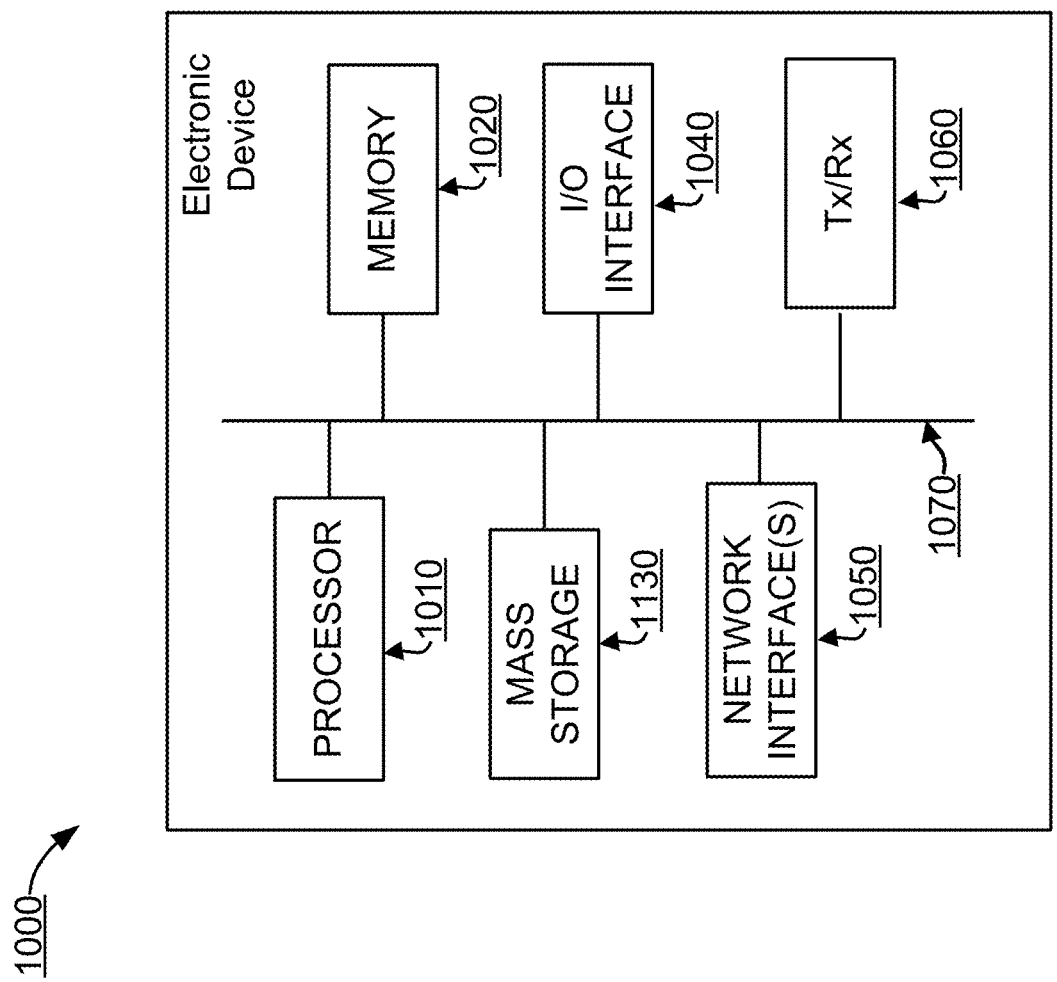
FIG. 10 illustrates, in a schematic diagram, an electronic device in accordance with embodiments of the present disclosure.

FIG. 10 is a schematic diagram of an electronic device 1000 that may perform any or all of operations of the above methods and features explicitly or implicitly described herein, according to different embodiments of the present disclosure. For example, a dedicated hardware capable of executing instructions for operation of the above methods and features may be configured as electronic device 1000. Further, a computer equipped with network function may be configured as electronic device 1000. The electronic device may be a mobile device or a device forming part of a cell or base station, a radio access node, control function, infrastructure, or other device in a wireless communication access network or core network. The electronic device may be a device forming part of a device forming part of a coordinator, a platform controller, an AI controller, an AI server (e.g. a local AI server deployed at the AI server location).

As shown, the device includes a processor 1010, such as a Central Processing Unit (CPU) or specialized processors such as a Graphics Processing Unit (GPU) or other such processor unit, memory 1020, non-transitory mass storage 1030, I/O interface 1040, network interface 1050, and a transceiver 1060, all of which are communicatively coupled via bi-directional bus 1070. According to certain embodiments, any or all of the depicted elements may be utilized, or only a subset of the elements. Further, the device 1000 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1020 may include any type of non-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A system including a platform controller for managing artificial intelligence (AI) services and a coordinator for managing data transmission of the AI services, wherein
the platform controller is configured to:
obtain, from an AI controller, a first security credential used for re-encryption of uplink data for an AI service, wherein the uplink data includes encrypted data from a device;
obtain, from the device, a second security credential for re-encryption of downlink data for the AI service, wherein the second downlink data includes encrypted data from an AI server;
provide, to the coordinator, both the first security credential and the second security credential; and
the coordinator is configured to:
receive, from the platform controller, both the first security credential and the second security credential;
perform re-encryption of the uplink data for the AI service and send re-encrypted uplink data to the AI server;
perform re-encryption of the downlink data for the AI service and send re-encrypted downlink data to the device.

2. The system of claim 1, the uplink data includes one or more of:
data used to update a set of parameters of an AI model for the AI service;
values each of which corresponds to one or more of a set of parameters of an AI model for the AI service.

3. The system of claim 2, the system further comprising the AI server configured to:
receive and decrypt the re-encrypted uplink data; and
update the AI model for the AI service according to the decrypted data.

4. The system of claim 3, the downlink data includes one or more of:
at least partial of the set of parameters with updated values;
data related to back propagation.

5. The system of claim 1, the platform controller further configured to:
indicate to the device, the coordinator and the AI server to activate at least one of re-encryption of uplink data and re-encryption of downlink data based on security credentials; wherein the coordinator is configured to perform re-encryption of data communicated between the device and the AI server as the platform controller indicates.

6. The system of claim 5, further comprising the AI server configured to:
receive the re-encrypted uplink data from the coordinator; and
perform decryption on the received re-encrypted uplink data if the platform controller indicates to activate at least re-encryption of uplink data based on security credentials.

7. The system of claim 6, further comprising the device configured to:
encrypt data based on a device security credential if the platform controller indicates to activate at least re-encryption of uplink data based on security credentials; and
send the encrypted data to the coordinator.

8. The system of claim 5, further comprising the device configured to:
receive the re-encrypted downlink data from the coordinator; and
perform decryption on the received re-encrypted downlink data if the platform controller indicates to activate at least re-encryption of downlink data based on security credentials.

9. The system of claim 8, further comprising the AI server configured to:
encrypt data based on a server security credential if the platform controller indicates to activate at least re-encryption of downlink data based on security credentials; and
send the encrypted data to the coordinator.

10. The system of claim 5, the platform controller further configured to:
indicate to the device, the coordinator and the AI server to de-activate at least one of activated re-encryption of uplink data and activated re-encryption of downlink data; wherein the coordinator is configured to stop performing re-encryption of data communicated between the device and the AI server as the platform controller indicates.

11. The system of claim 1, the platform controller further configured to:
receive, from the AI controller, an AI service registration request for registering the AI service, wherein the AI service registration request includes the first security credential.

12. The system of claim 1, the platform controller further configured to:
receive, from the AI controller, a request for training associated with the AI model for the AI service, wherein the request includes the first security credential.

13. The system of claim 1, the platform controller further configured to:

receive, from the device, a request for access to the AI service, wherein the request includes the second security credential.

14. A method for managing artificial intelligence (AI) services, the method comprising:
   obtaining, by a platform controller from an AI controller, a first security credential used for re-encryption of uplink data for an AI service, wherein the uplink data includes encrypted data from a device;
   obtaining, by the platform controller from the device, a second security credential for re-encryption of downlink data for the AI service, wherein the second downlink data includes encrypted data from an AI server;
   providing, by the platform controller to a coordinator, both the first security credential and the second security credential; and
   receiving, by the coordinator from the platform controller, both the first security credential and the second security credential;
   performing, by the coordinator, re-encryption of the uplink data for the AI service and send re-encrypted uplink data to the AI server;
   performing, by the coordinator, re-encryption of the downlink data for the AI service and send re-encrypted downlink data to the device.

15. The method of claim 14, the method further comprising:
   indicating, by the platform controller to the device, the coordinator and the AI server to activate at least one of re-encryption of uplink data and re-encryption of downlink data based on security credentials; wherein the coordinator is configured to perform re-encryption of data communicated between the device and the AI server as the platform controller indicates.

16. The method of claim 15, further comprising:
   receiving, by the AI server, the re-encrypted uplink data from the coordinator; and
   performing, by the AI server, decryption on the received re-encrypted uplink data if the platform controller indicates to activate at least re-encryption of uplink data based on security credentials.

17. The method of claim 16, further comprising:
   encrypting, by the device, data based on a device security credential if the platform controller indicates to activate at least re-encryption of uplink data based on security credentials; and
   sending, by the device, the encrypted data to the coordinator.

18. The method of claim 15, further comprising:
   receiving, by the device, the re-encrypted downlink data from the coordinator; and
   performing, by the device, decryption on the received re-encrypted downlink data if the platform controller indicates to activate at least re-encryption of downlink data based on security credentials.

19. The method of claim 18, further comprising:
   encrypting, by the AI server, data based on a server security credential if the platform controller indicates to activate at least re-encryption of downlink data based on security credentials; and
   sending, by the AI server, the encrypted data to the coordinator.

20. The method of claim 15, the platform controller further configured to:
   indicating, by the platform controller to the device, the coordinator and the AI server to de-activate at least one of activated re-encryption of uplink data and activated re-encryption of downlink data; wherein the coordinator stops performing re-encryption of data communicated between the device and the AI server as the platform controller indicates.

* * * * *